R. VON REPPERT.
CALCULATING MACHINE.
APPLICATION FILED OCT. 22, 1912.
1,253,310.
Patented Jan. 15, 1918.
18 SHEETS—SHEET 6.
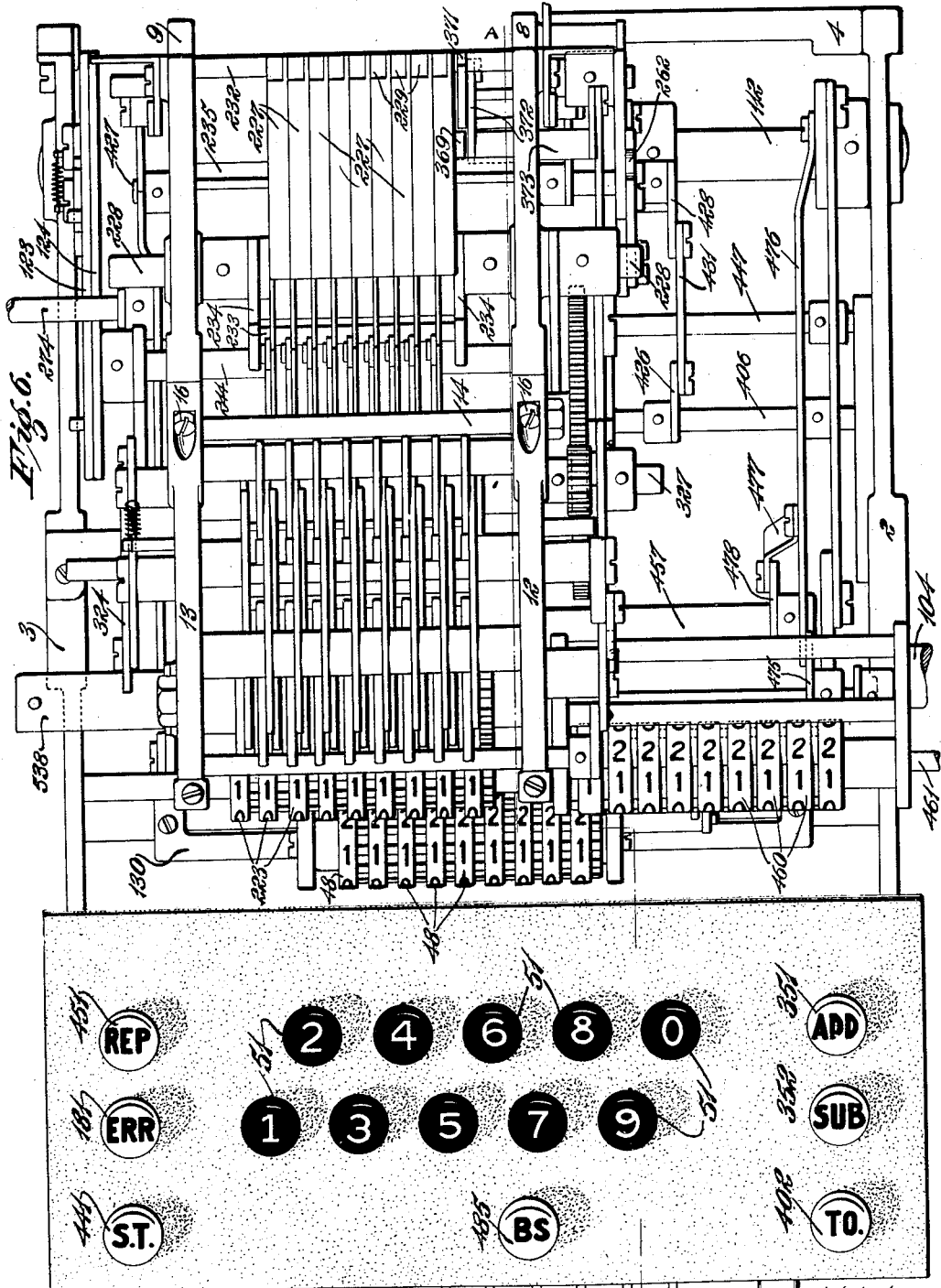

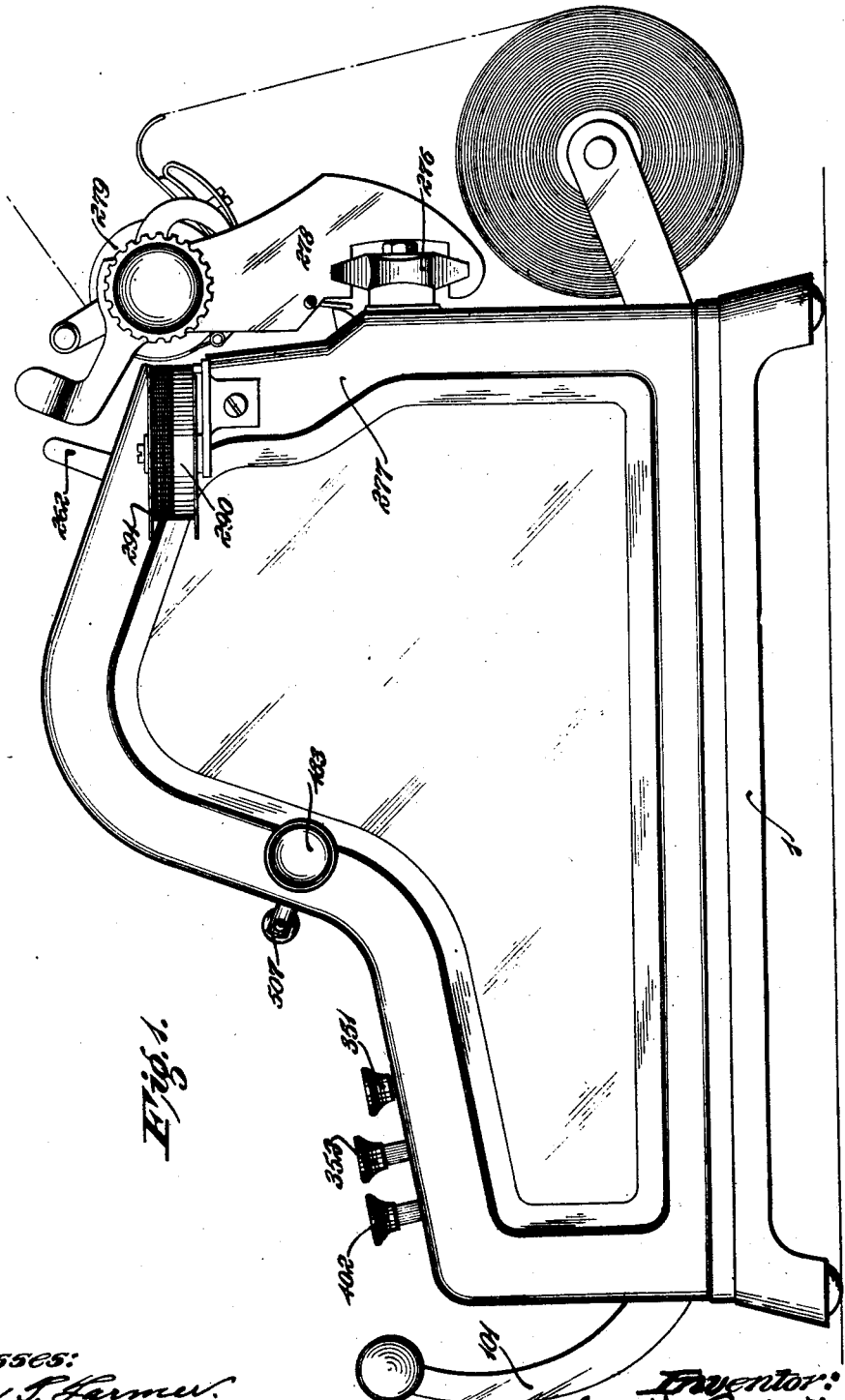

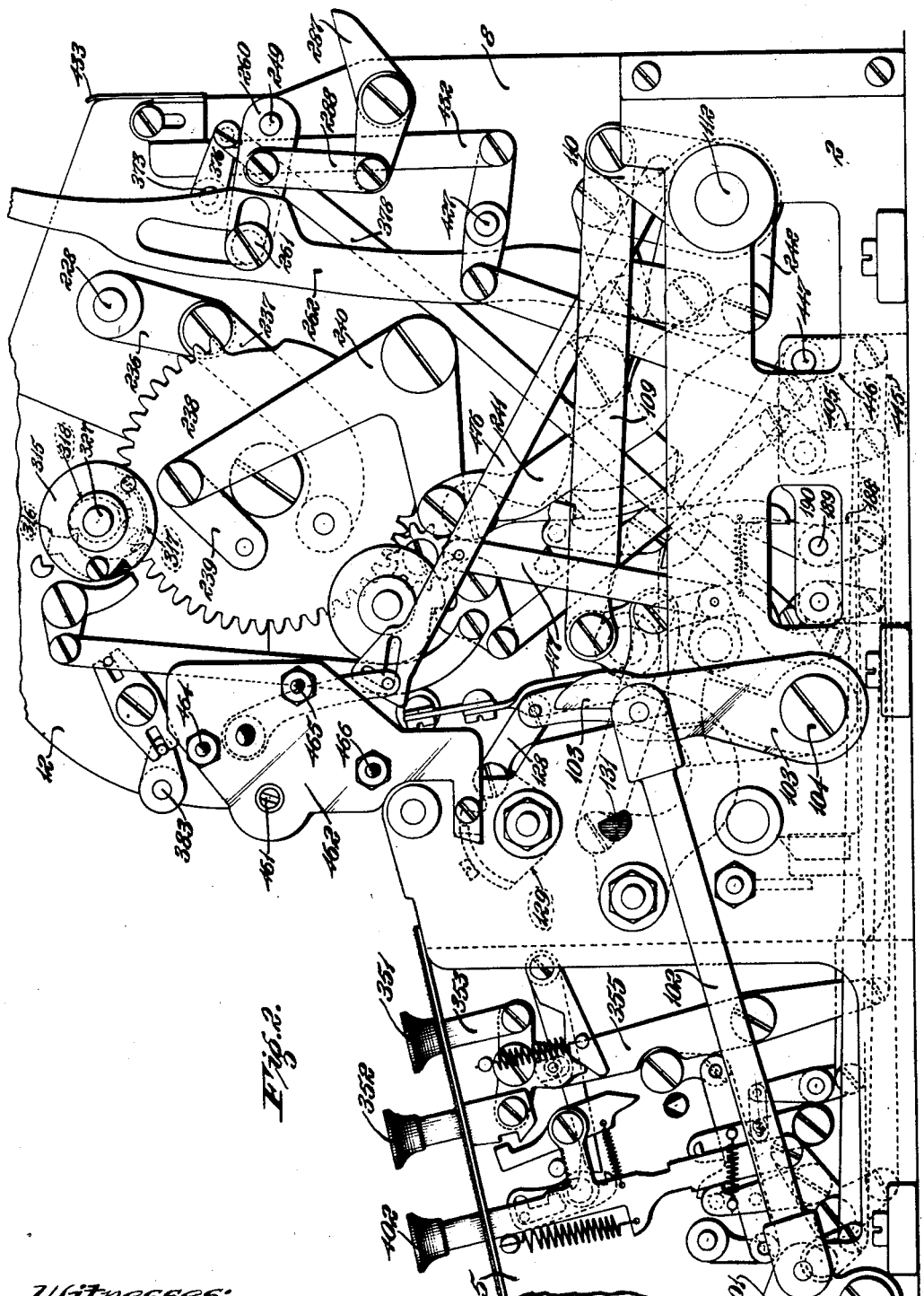

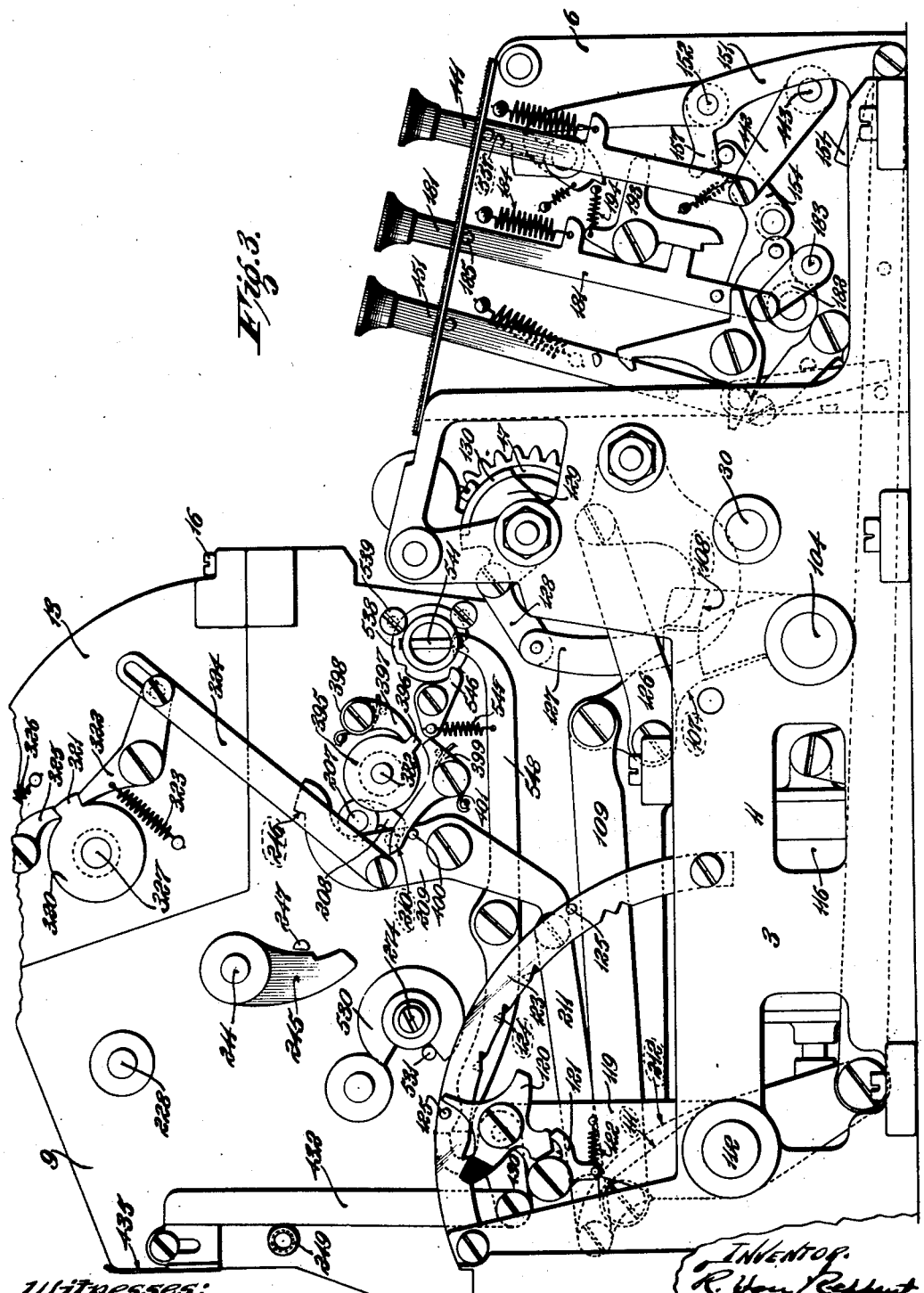

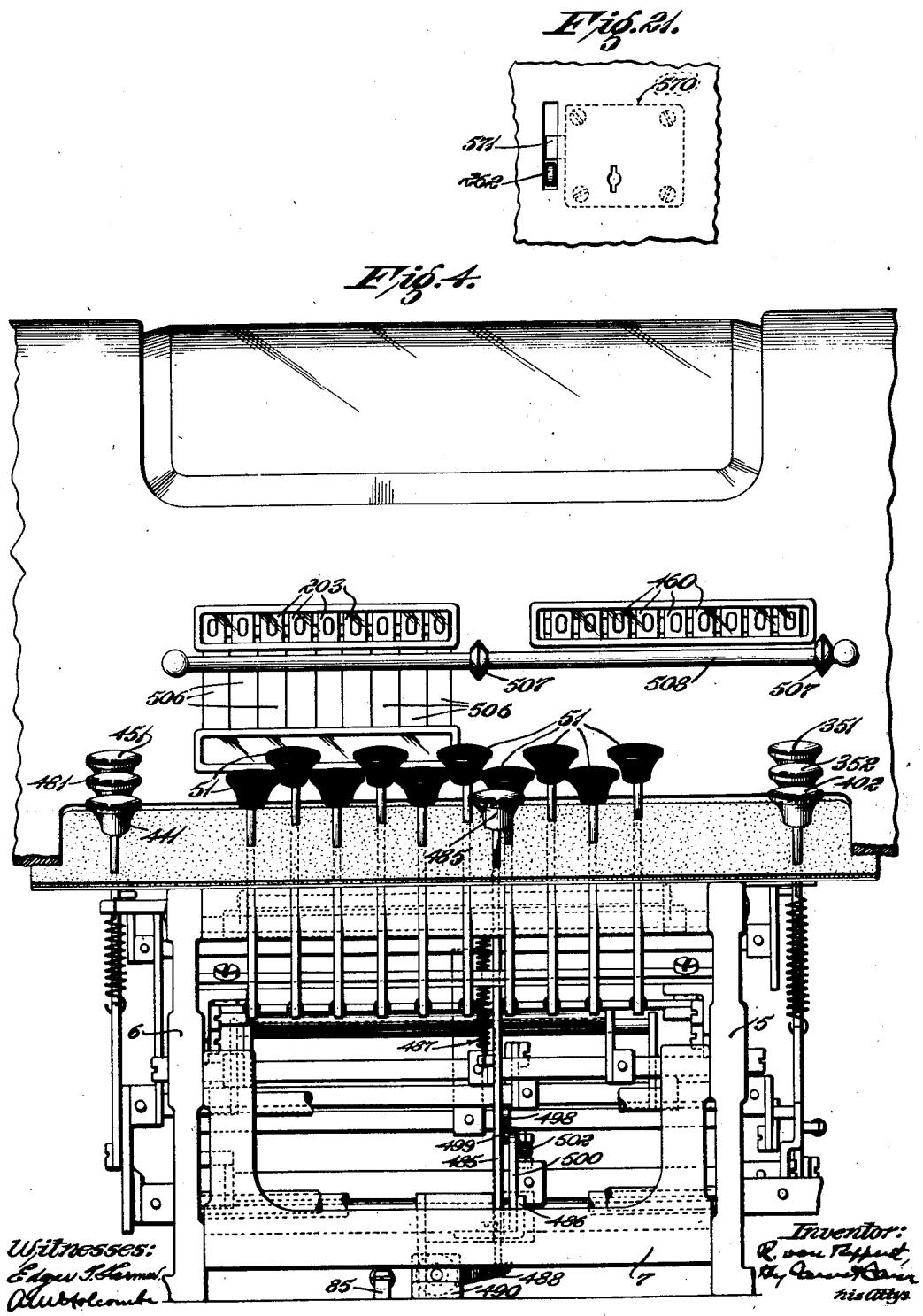

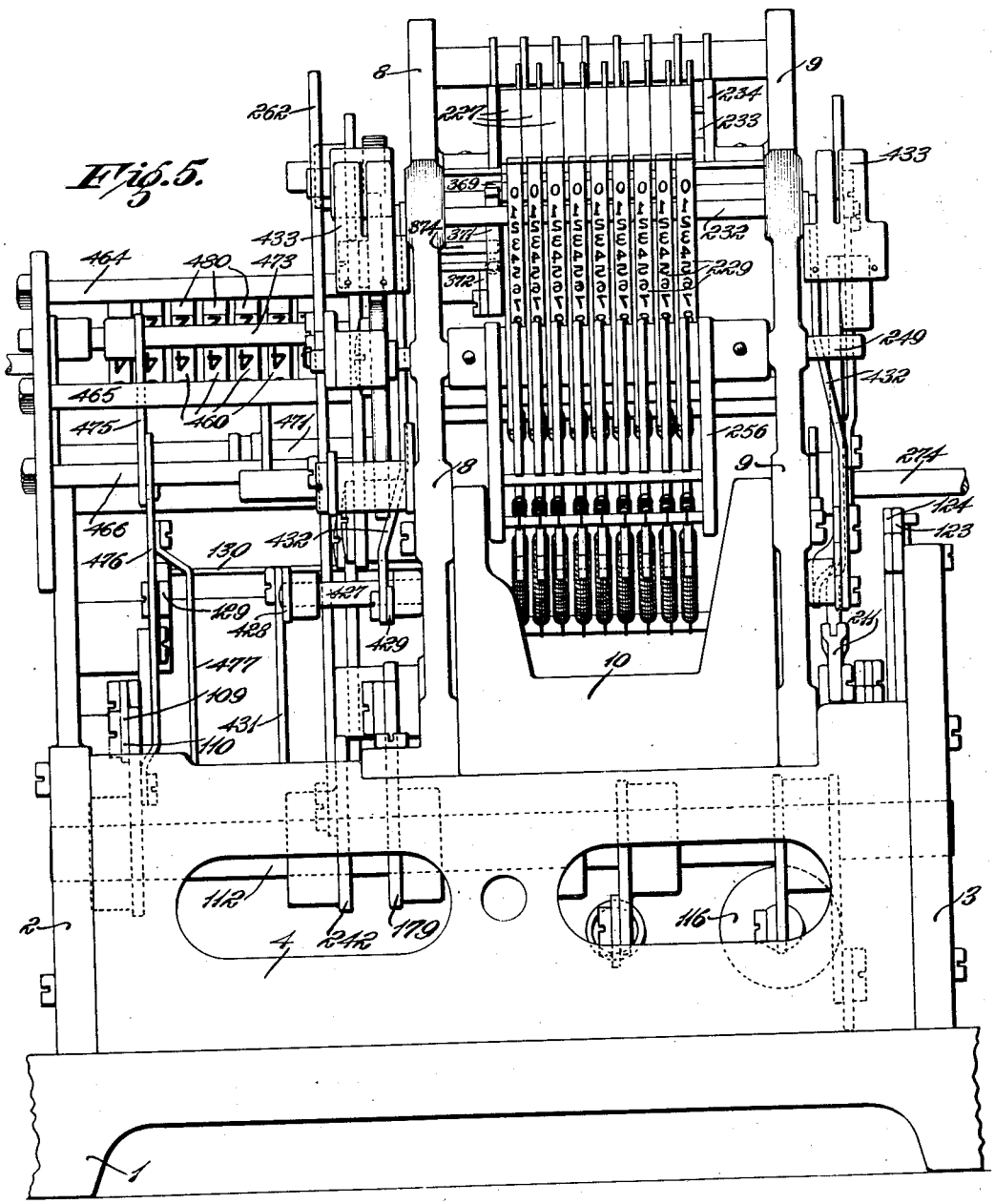

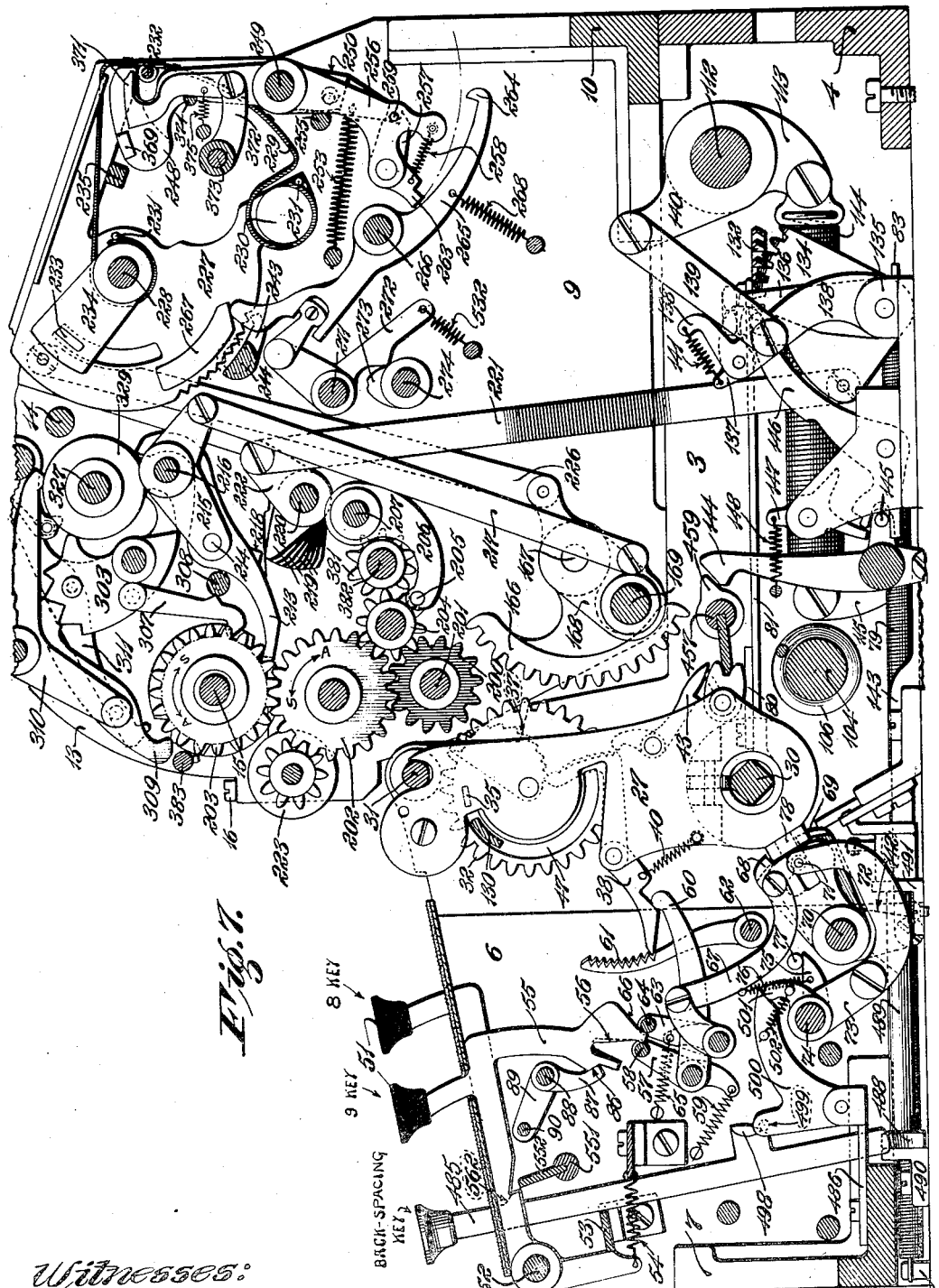

R. VON REPPERT.
CALCULATING MACHINE.
APPLICATION FILED OCT. 22, 1912.

1,253,310.

Patented Jan. 15, 1918.
18 SHEETS—SHEET 8.

R. VON REPPERT.
CALCULATING MACHINE.
APPLICATION FILED OCT. 22, 1912.
1,253,310.
Patented Jan. 15, 1918.
18 SHEETS—SHEET 9.
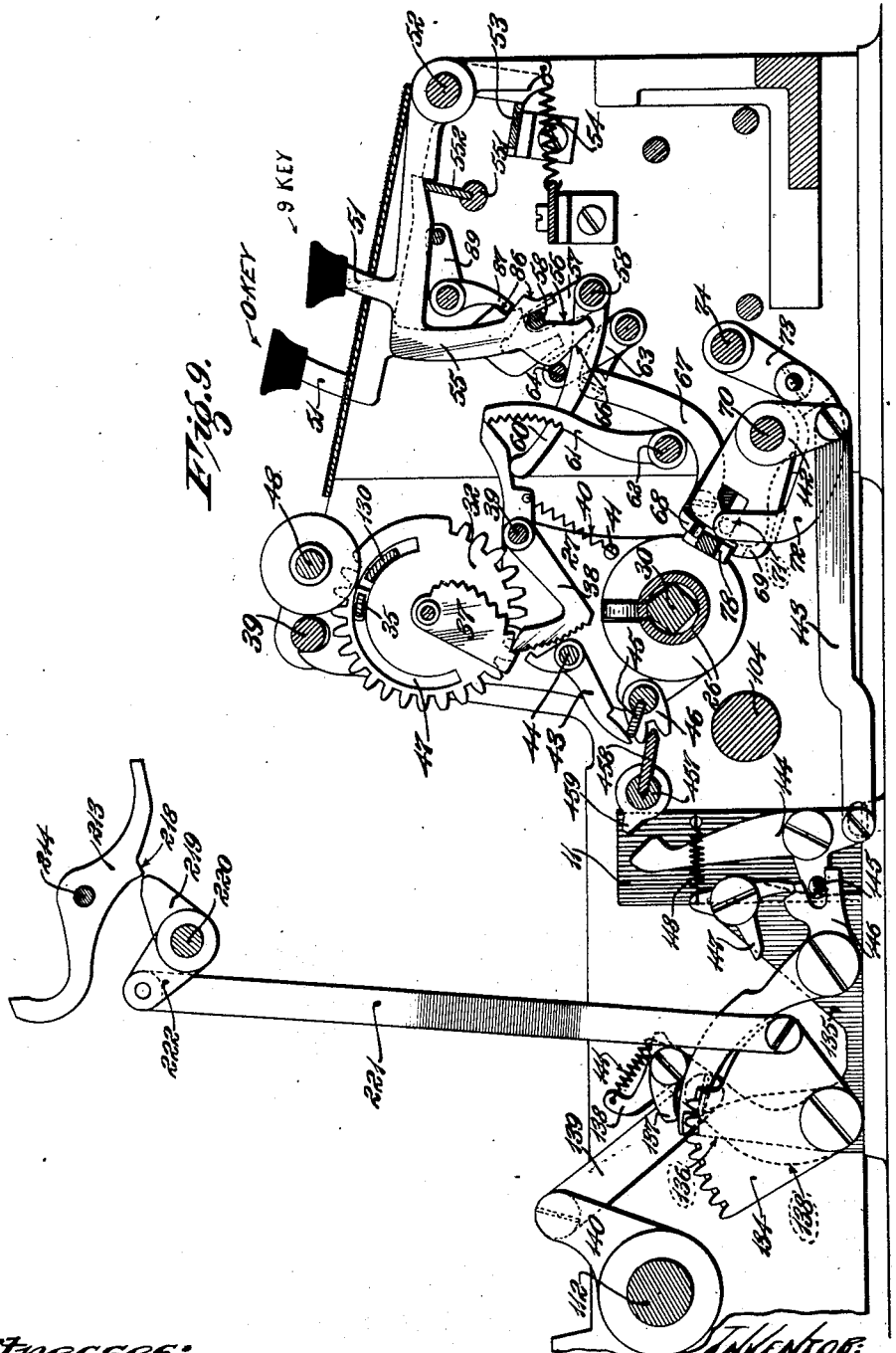

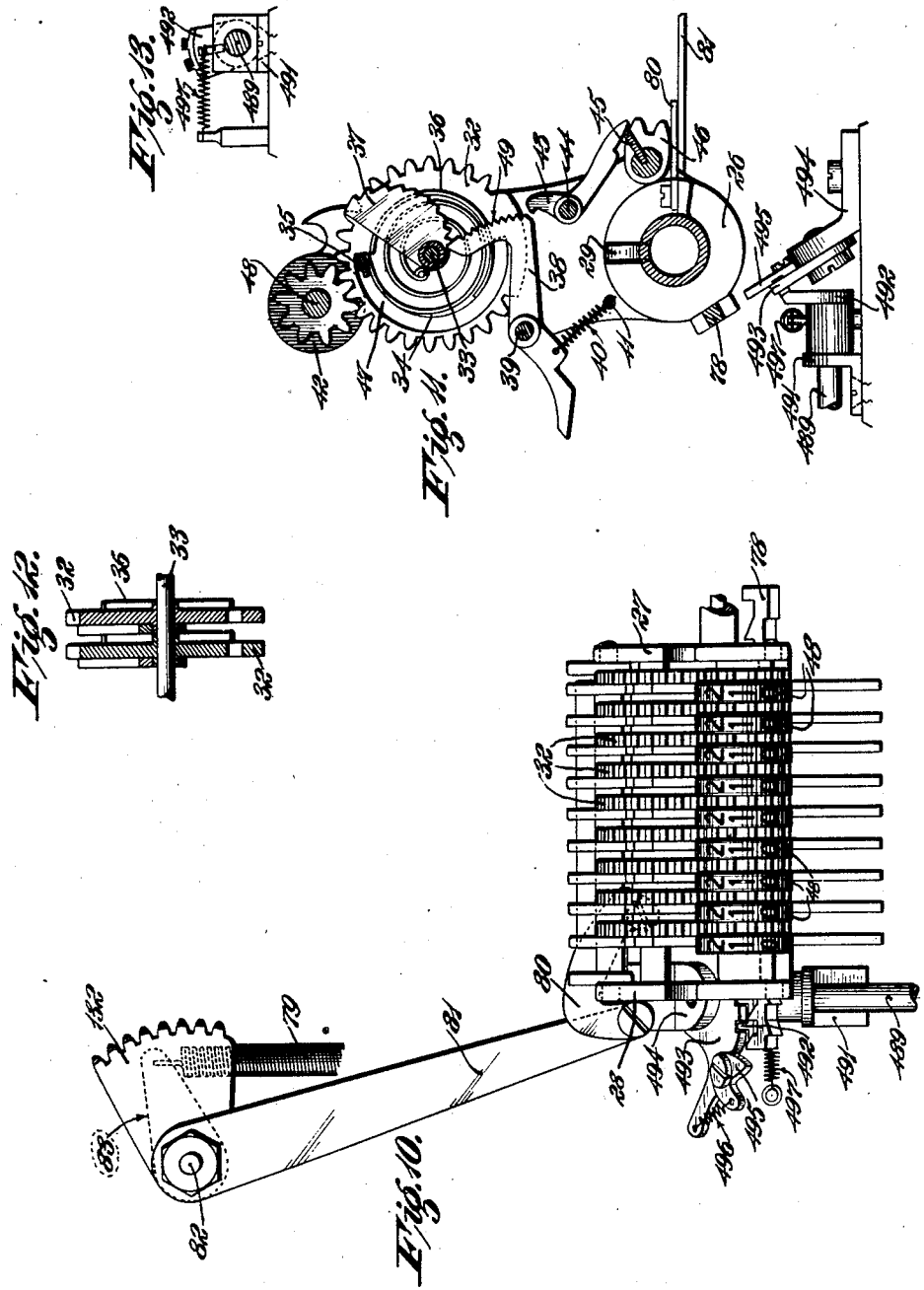

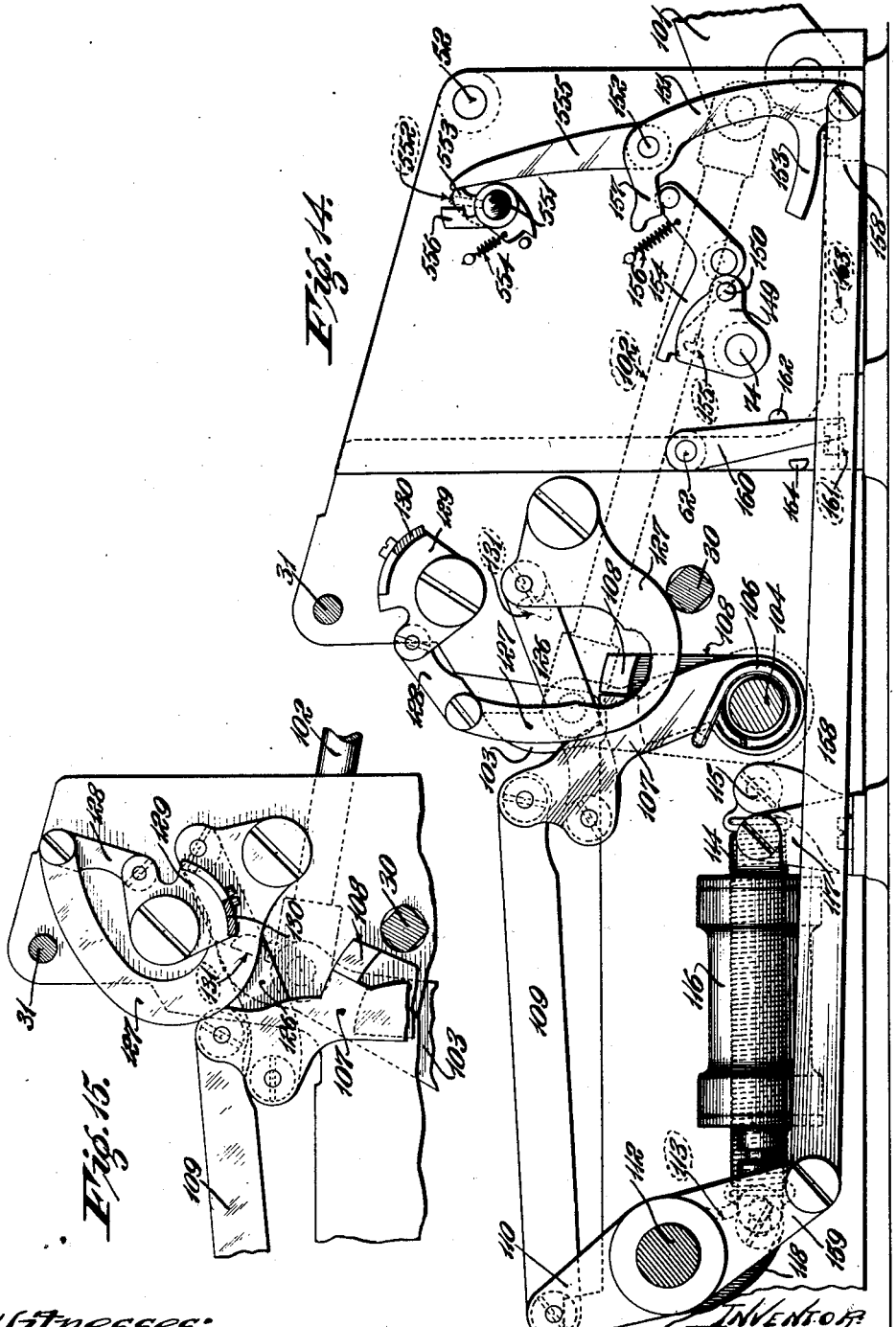

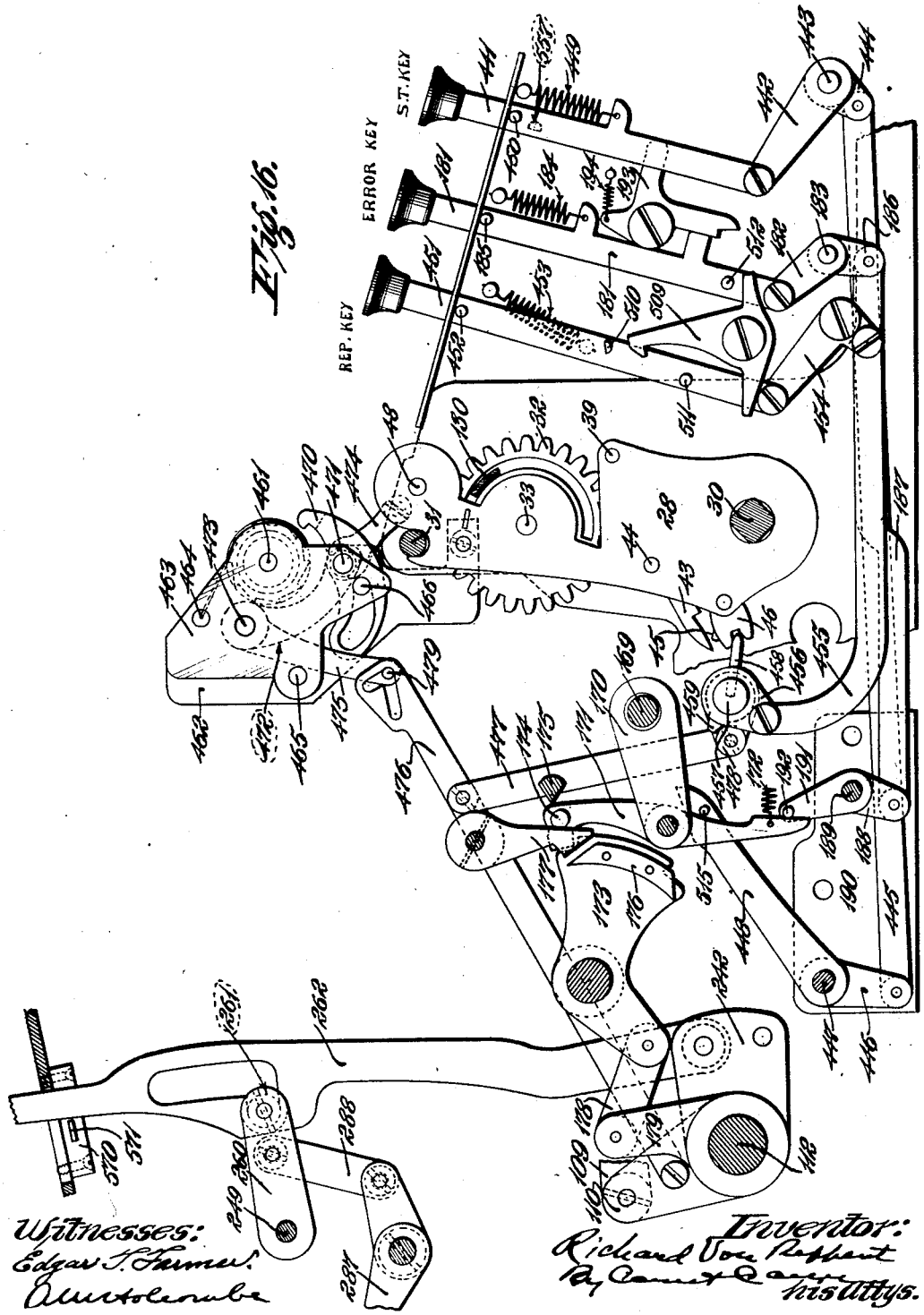

R. VON REPPERT.
CALCULATING MACHINE.
APPLICATION FILED OCT. 22, 1912.
1,253,310.
Patented Jan. 15, 1918.
18 SHEETS—SHEET 13.
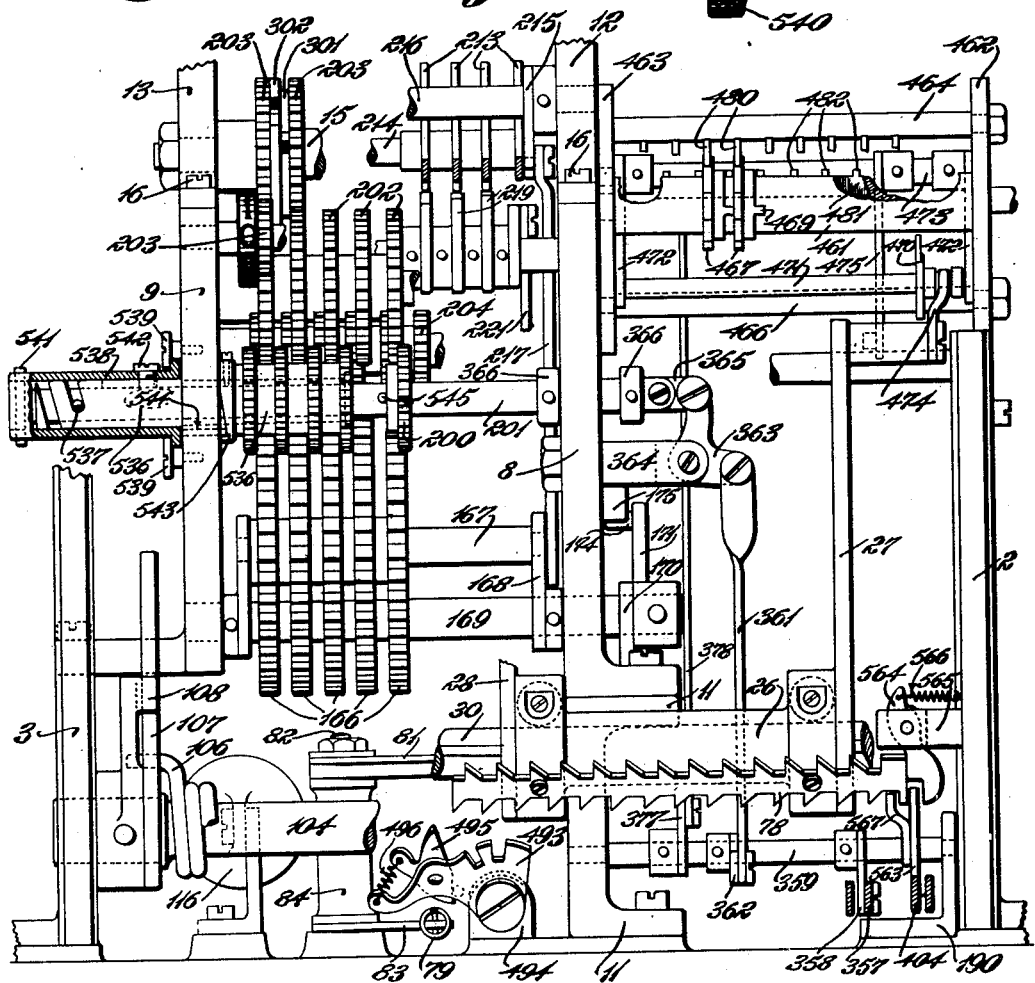

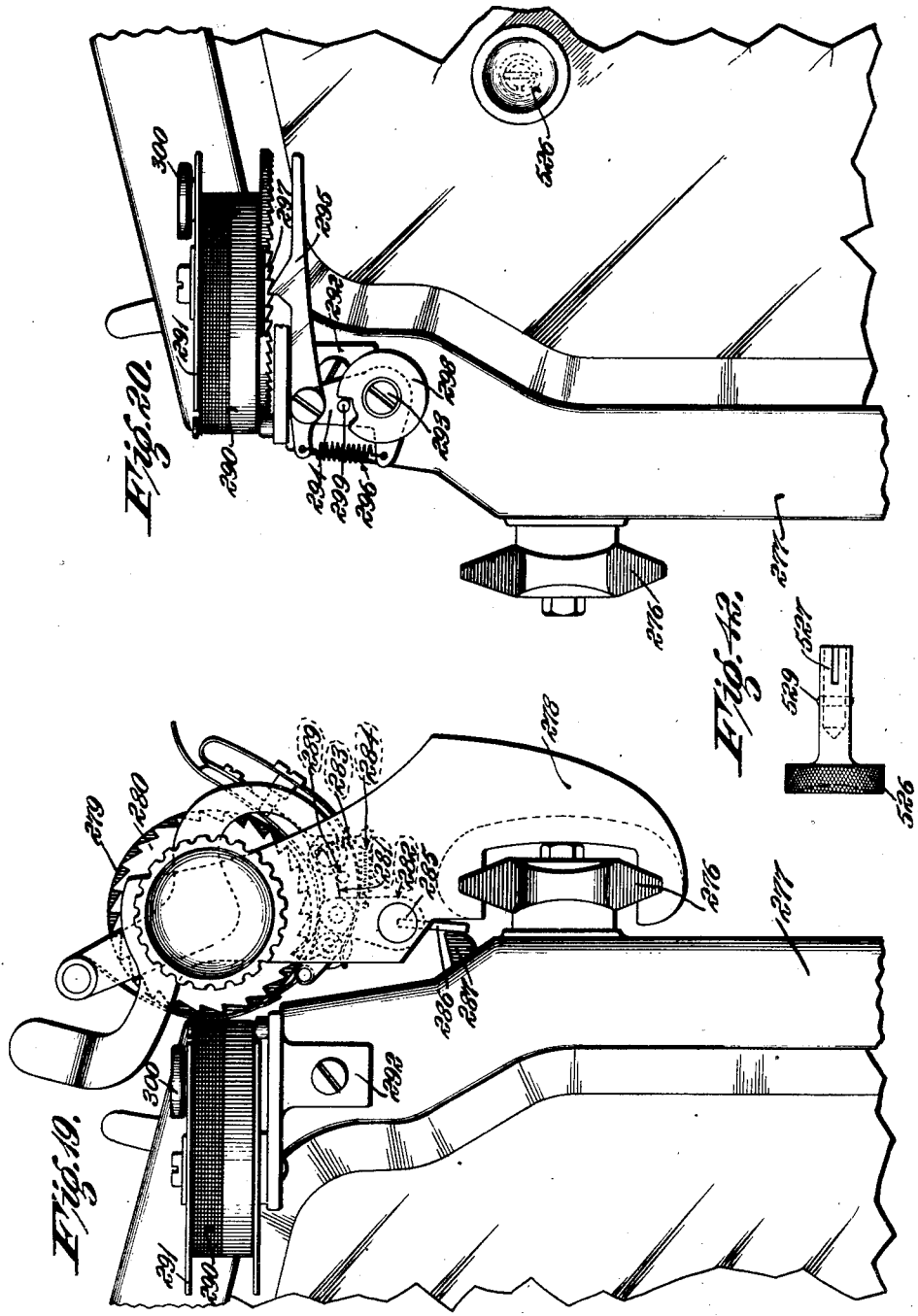

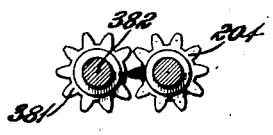

R. VON REPPERT.
CALCULATING MACHINE.
APPLICATION FILED OCT. 22, 1912.
1,253,310.
Patented Jan. 15, 1918.
18 SHEETS—SHEET 16.
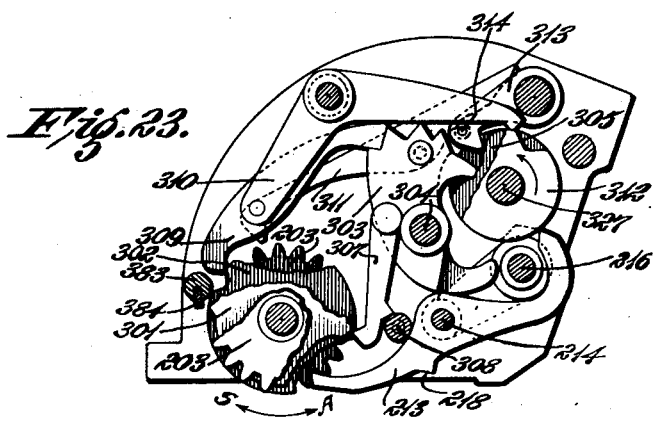
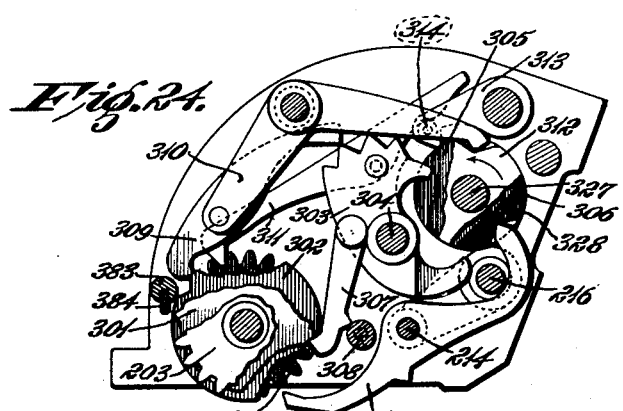
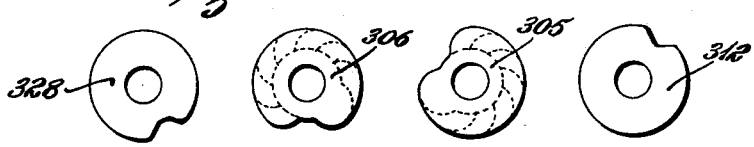
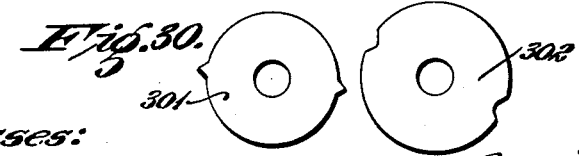

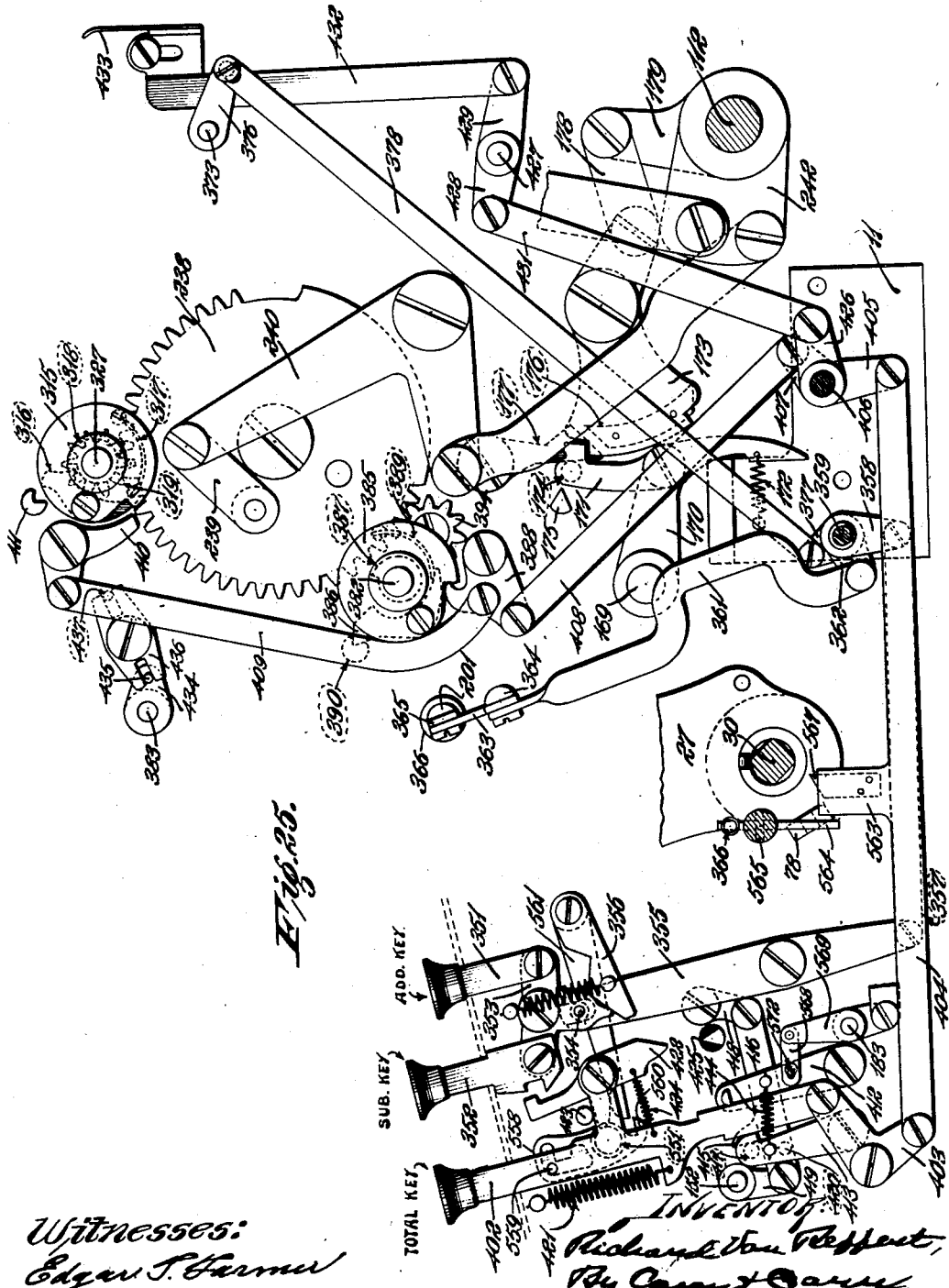

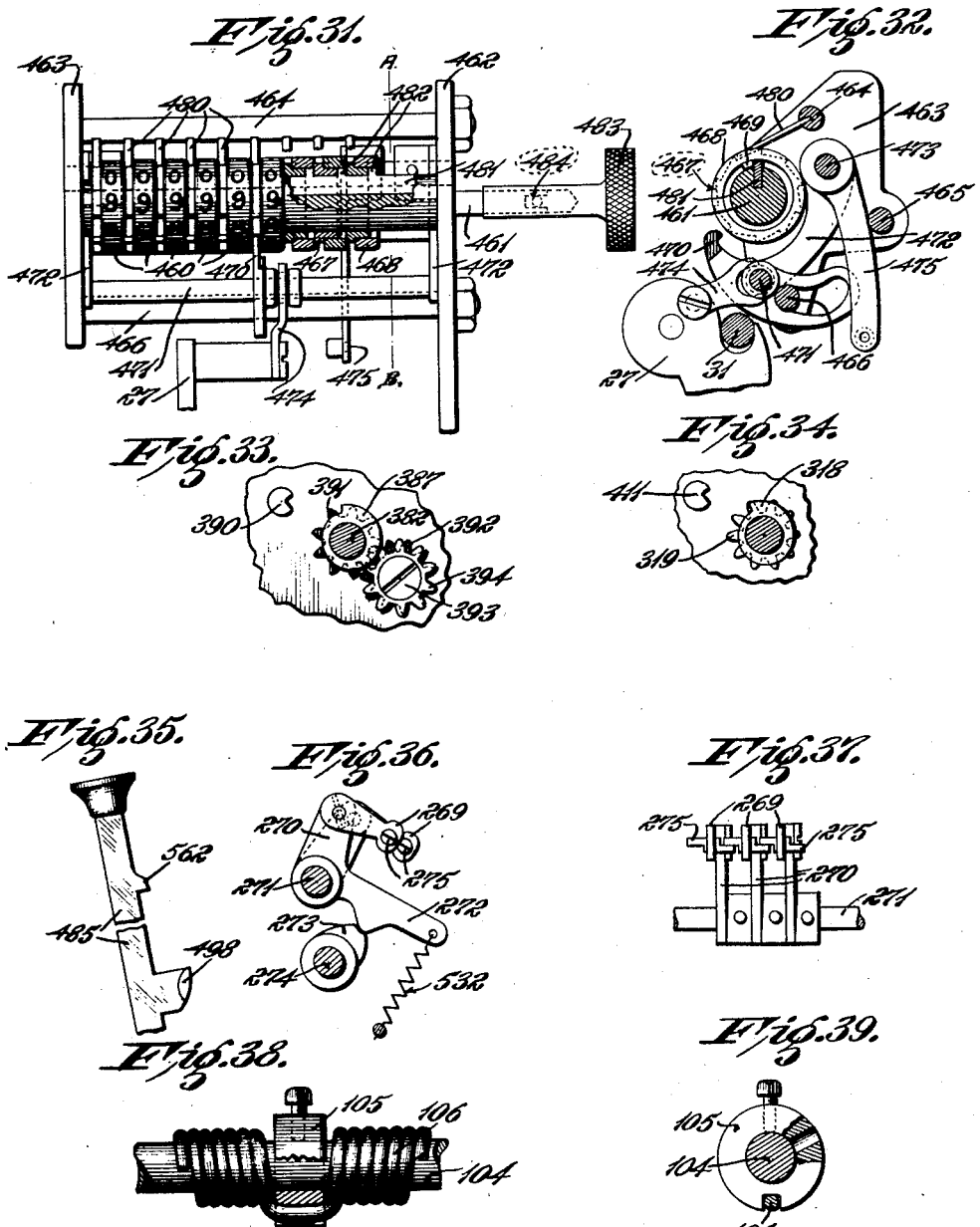

UNITED STATES PATENT OFFICE.

RICHARD VON REPPERT, OF ST. LOUIS, MISSOURI.

CALCULATING-MACHINE.

1,253,310.

Specification of Letters Patent.

Patented Jan. 15, 1918.

Application filed October 22, 1912. Serial No. 727,159.

*To all whom it may concern:*

Be it known that I, RICHARD VON REPPERT, a citizen of the United States, residing at St. Louis, State of Missouri, have invented certain new and useful Improvements in Calculating-Machines, of which the following is a specification.

My invention relates to calculating machines and has for its general object the construction of a machine that performs the four fundamental calculations, addition, subtraction, multiplication and division, as well as other useful commercial work, in a practical manner; a machine whose work is absolutely accurate and subject to visual control, and one that can be operated with very little manual effort at great speed.

Other objects are, to provide a machine in which the item or items, the accumulated total, and the multiplier or quotient, respectively, are visually displayed on numeral disks; to provide a machine having movable decimal point lugs to be used primarily in conjunction with multiplication and division to point off the decimal places on the numeral disks; to provide a machine having a flexible and speedy key action by arranging that a depressed key is restored to its normal position by the operation of another key; to provide an item entering and item wheel clearing device actuated by the operating lever, the moving parts being so arranged that continuous movement of the operating lever is transformed into movement of the clearing device having gradually diminishing velocity, in order to equalize the resistance of the item members and gear trains and to avoid shocks to the machine, to provide an item mechanism having spring-driven item members mounted in a carriage and arranged to be set to represent an item and simultaneously to move into proper coöperative position with the totalizing mechanism; to provide key actuated stop devices to release and set the item members so arranged that an item member is released by the actuation of a key and the stop member is positioned and remains positioned until after the actuation of a second key, thereby giving the item members ample time to assume the desired position when the keys are most rapidly actuated; to provide a totalizing mechanism of novel and simple construction in which all parts have positive constraint motion and are positively locked against accidental movement in all phases the machine assumes; to provide a totalizing mechanism which automatically reverses when subtracting movement is imparted to the total wheels; to provide a machine having a train lock to lock the several trains against accidental movement and unlock as many trains as are engaged by item wheels; to provide a machine having a series of movable gear sectors which are permanently connected to the type sectors and which are arranged to move simultaneously to engage both the item wheels and a series of gears connected with the total wheels to thereby establish positive operative connection between the item wheels, the total wheels and the type sectors; to provide an item retaining device of novel and simple construction arranged to lock the retaining pawls of the item members in the respective positions at which they have been set by the keys, thereby to retain a set up item for repeated addition or subtraction as is necessary for multiplication and division; to provide a machine having a printing mechanism arranged to be split so that two columns of figures may be added and printed without showing ciphers between the two columns; to provide a machine in which certain of the total wheels can be eliminated from receiving entering movement so that the type sectors corresponding to these total wheels can be utilized for printing numbers not to be added or subtracted; to provide a machine arranged to print two columns of figures and having means for adding and printing the total of one of said columns of figures; to provide a machine having a clearing device for the total wheels, actuated by the operating lever and arranged to transform continuous and uniform movement of the operating lever into movement of gradually diminishing velocity to equalize the resistance of the clearing trains and to avoid shocks to the machine; to provide means for insuring that the actuating lever shall be moved to its full stroke, thus insuring a complete cycle of operations; to provide a machine having positive locking means controlled by the actuating lever for preventing operation of the figure keys, back-spacing key, adding and subtracting keys, total and sub-total keys during the full forward and return stroke of the actuating lever; to provide a lock for the total key to lock the same against operation when the item wheel carriage is out of normal position; to provide a lock for the item wheel carriage to lock the same in normal position by the operation of the total key; to provide a latch for the total key to lock the same in depressed position, and means to unlatch the same by the operation of the error key, to provide a machine arranged to automatically print the minus sign adjacent to each item entered while the machine is set for subtraction; to provide a machine that can be locked in printing or non-printing position so that all items entered are respectively either printed and accumulated or only accumulated and not printed.

The expression "set up" as employed in this specification refers to the movement of parts in proportion to the figures of an item or amount.

The expression "positive constraint motion" as employed in this specification refers to the movement of parts by means under positive mechanical control without the employment of springs or yielding elements.

These objects, and others as will appear hereinafter, are accomplished in the calculating machine illustrated in the accompanying drawings forming part of this specification. The improvements and combinations of parts constituting my invention are fully set forth in the following description, and will be pointed out with particularity in the appended claims.

In the drawings, in which like symbols are used to designate like parts wherever they appear, Figure 1 is a side view of the complete machine;

Fig. 2 is a right side elevation thereof with the casing removed;

Fig. 3 is a left side elevation thereof with the casing removed;

Fig. 4 is a partial front elevation thereof with the front part of the casing removed;

Fig. 5 is a rear elevation thereof with the casing removed;

Fig. 6 is a plan view thereof with the casing removed;

Fig. 7 is longitudinal section on the line A—B in Fig. 6;

Fig. 9 is a side detail view showing a key and the parts actuated thereby in moved position;

Fig. 10 is a plan detail view of the item wheel carriage;

Fig. 11 is a sectional view of the item wheel carriage and a side detail view of the back-spacing device;

Fig. 12 is a sectional view of two adjacent item wheels, the springs being omitted;

Fig. 13 is a detail of the back-spacing device as seen from the left in Fig. 11;

Fig. 14 is a side detail view of the operating lever connections, showing the shock-preventing devices, the actuating means for the item-wheel clearing mechanism, and the left side plate of the key-board and the parts thereon actuated by the operating lever;

Fig. 15 is a detail view of the clearing mechanism actuating levers in actuated position.

Fig. 16 is a left side detail view, showing the connections of the repeat, error and sub-total keys, the actuating mechanism for the gear-sector rocking frame, and the lever actuating the printing mechanism, paper and ribbon feed, and lock therefor for locking these parts in operative or inoperative position;

Fig. 17 is a part cross-section and part front elevation of the mechanism behind the key-board, some of the parts being omitted;

Fig. 19 is a view of a part of the right side of the casing showing the paper carriage and paper feed mechanism in end elevation;

Fig. 20 is a view of a part of the left side of the casing, showing the ribbon feed mechanism in side elevation;

Fig. 21 is a top view of a portion of the casing showing the end of the lever for actuating the printing mechanism and lock for locking the same in operative or inoperative position;

Fig. 22 is a perspective view of the total wheel gear train arrangement and the carrying mechanism, showing the carrying parts in normal position and the gear wheel 200 set in adding position;

Fig. 23 is a detail view, partly broken away, of the carrying mechanism, showing a carrying train set for addition;

Fig. 24 is a similar detail view of the carrying mechanism, showing a train in the act of carrying;

Fig. 25 is a right side detail view, showing the connections of the adding, subtracting and total keys and the locks therefor; also the carriage lock, the drive mechanism for the carrying mechanism and the clearing pinions, and the mechanism for rocking the frame carrying the gear sectors;

Fig. 26 is a front detail view of a total wheel gear train arrangement, the gear 200 being shown in full lines in position for addition and in dotted lines in position for subtraction and clearing;

Fig. 27 is a side detail view of the totalizer clearing gear and its driving pinion, showing them in normal position;

Fig. 28 is a top view of the gear and pinion shown in Fig. 27;

Fig. 29 is a detail of the carrying mechanism, showing the four disks or cams comprising a set for the actuating cam shaft;

Fig. 30 is a detail of the carrying mechanism, showing a set disk and a lock disk for a total wheel;

Fig. 31 is a front view, partly in section, of the register;

Fig. 32 is a sectional view of the register on the line A—B in Fig. 31;

Fig. 33 is a detail of part of the drive mechanism for the total wheel clearing pinions;

Fig. 34 is a detail of part of the drive mechanism for the carrying mechanism;

Fig. 35 is a side view of a portion of the back-spacing key;

Figs. 36 and 37 are details of the splitting device for the zero printing mechanism;

Figs. 38 and 39 are details of the shock spring and its mounting;

Fig. 40 is a view of the notch collar 543;

Fig. 41 is a view of knob 540 which actuates the eliminating device;

Fig. 42 is a detail view of the thumb knob for setting the two column figure printing device in operative and inoperative position.

Figure 18:
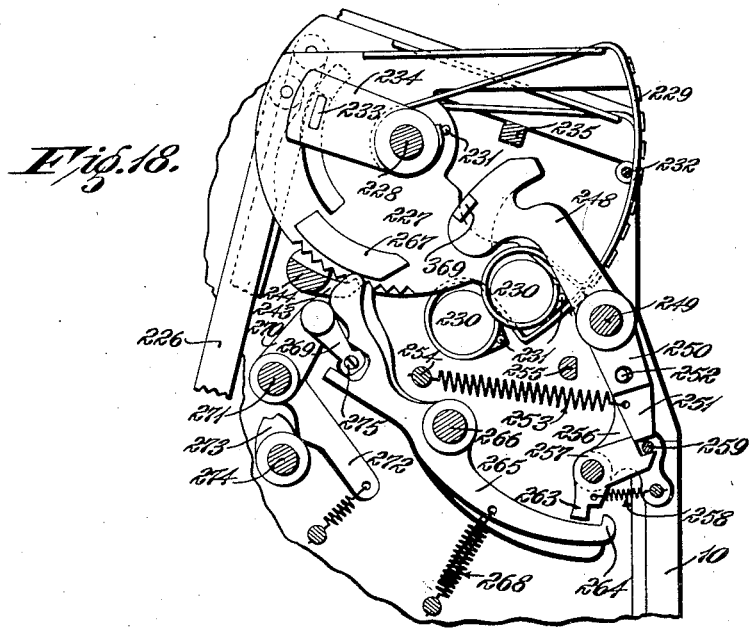
Fig. 18 is a detail view of the printing mechanism, showing a type sector and hammer in moved position.

Before describing the constructional details of the calculating machine illustrated in the drawings, the manner of operating the machine to perform the four arithmetical processes, addition, subtraction, multiplication and division, will be briefly explained as follows:

Operation of the machine.

To enter or add an item.

The operation of the figure keys actuates escapement mechanism controlling a series of item wheels and the laterally movable carriage in which they are mounted, thereby causing the item wheels to be rotated or "set," to represent an item, and also moving them into the proper coöperative position with the totalizing devices. The forward stroke of the operating lever rotates the item wheels to normal position, and, through suitable intervening mechanism, transfers this return movement of rotation into the totalizer and to the type sectors. At the end of its forward stroke, the operating lever causes printing to take place. The return stroke of the operating lever returns the carriage and type sectors to normal position.

To subtract an item.

The subtracting key sets the mechanism intervening between the item wheels and the totalizer in such a position that, upon entering an item, the total wheels will be rotated in the reverse direction to that in which they rotate when the machine is in normal, or adding position.

To repeat an item.

After the item to be repeated has been set up in the item wheels, the repeat key is depressed. This sets an item retaining mechanism mounted in the item wheel carriage in effective position and also disconnects the carriage from the devices which ordinarily return it to normal position; furthermore, a register, to count the number of times the item is repeated, is connected up with the operating lever. The item may then be repeatedly added or subtracted by the repeated actuation of the operating lever without restriking the same on the keys.

Multiplication.

Multiplication is accomplished by repeated addition. For instance an item is to be multiplied by 254. The item is set up in the item wheels by the use of the figure keys, then the repeat key is depressed and the operating lever is actuated four times, i. e. the last figure of the multiplier. The zero figure key is operated once; this moves the set up item wheels into coöperative position with the totalizing gears of the next higher decimal order and simultaneously adds a cipher to the item, which is equivalent to multiplying it by ten. In this position the operating lever is actuated five times, i. e. the second figure of the multiplier; then the zero key is again operated once, following which the operating lever is actuated twice. The register disks will show the figure 254, i. e. the multiplier; and the product is visually displayed on the numeral disks of the totalizer. To reset the item wheels, the error key is depressed and the operating lever actuated, which also restores the repeat key to normal position.

Division.

Division is accomplished by repeated subtraction. For instance to divide 7983 by 362. The dividend 7983 is struck on the keys and entered into the totalizer. If it is desired to obtain a fraction in the result, two ciphers are struck and added to the item before entering it, so that the number 798300 is visually displayed on the totalizer disks when the item is entered. Two movable lugs, representing decimal points, are mounted on the casing and one is now moved to point off the two ciphers displayed on the totalizer disks. The divisor 362, is now set up in the item wheels by means of the figure keys, and the zero key is operated three times in order to add sufficient ciphers to bring the left hand figure of the item, or divisor, under the left hand figure of the dividend displayed on the totalizer disks, thus,

```
        7983000
        3620000
```

To assist in positioning the item wheel carriage, vertical order lines are provided on the casing. The machine is now set for subtraction and the repeat key is depressed. The operating lever is now successively operated, until a visual inspection will show that 362 cannot be subtracted any more from the three left hand figures of the dividend, that is, twice. The condition will now be thus

```
        074300
        362000
```

The back spacing key is now operated and moves the item one decimal point to the right, thus

```
        074300
         36200
```

The operating lever is again actuated twice, i. e. 362 can be subtracted twice, the condition then being thus,

```
          1900
         36200
```

The register disks will now show 22, which is the entire part of the result, and before continuing the division, the other decimal point is moved to point off the fractional part of the result. The back spacing key will have to be actuated twice in order to continue the subtraction, and in this position the operating lever is actuated five times, leaving a remainder of .90. The result of the division, 22.05, is shown on the register.

*To print dates or numbers not to be added or subtracted.*

The four left hand totalizing gears are arranged to be disconnected so that they are not subject to any entering movement. For instance, it is desired to make the following entries, the left column denoting dates:

```
     1 75000
     2  7956
     5 98325
    13   575
    22  9560
    ―――――――――
       191416
```

The two knobs on the left side of the casing are rotated to "set" position. The forward knob shifts the gears connecting the item wheels with the four left hand totalizer gears into neutral position, and the rear knob breaks the connection of the hammer tripping devices between the third and fourth hammers. This device ordinarily causes a cipher to be printed to the right of any significant figure entered into the machine.

The above items are now successively entered by first striking off the date on the figure keys, then striking the zero key as many times as there are spaces between the last figure of the date and the first figure of the amount, and then striking off the amount on the figure keys. By reason of the above mentioned devices, when the items thus set up are entered the zeros between the dates and amounts will not be printed, and the work will appear as shown above. The sum total of the addition may extend to the full capacity of the machine, but before printing the total the machine must be reset to normal position. In a like manner amounts may be subtracted from a total and dates or numbers accompanying the amounts may be printed simultaneously.

To split the machine so that two columns of figures may be added or subtracted the split knob to the rear on the left of the machine is set. This sets the machine so that a left column with a capacity of three figures and a right column with a capacity of five figures is provided. The left column may be used now to add the number of articles, as barrels, bushels, etc., and the right column to add the weights or amounts, etc.

*To print the total.*

The total key is depressed, which sets the machine in subtracting position and also connects a set of clearing pinions with the operating lever. The operating lever is now actuated and, through these clearing pinions, the total gears are returned to zero position and simultaneously the movement of each total gear is transferred to the type sector corresponding thereto. During the return stroke of the operating lever the connection between the total gears and the type sectors is broken, and the type sectors are returned to normal position.

*To print a subtotal.*

The total key is depressed, then the subtotal key is depressed and held down during the operation of the operating lever, thereby maintaining operative connection between the type sectors and totalizing gears during the return stroke. During the return stroke the type sectors are returned to normal position and their return movement is transferred back into the totalizing gears.

If desired, the printing mechanism may be thrown out of operative relation and no printed record made of the calculations performed by the machine. A cabinet lock is provided to lock the printing mechanism actuating lever in either operative or inoperative position.

Description of the machine.

In describing the construction and mechanical operation of the machine, the various parts and mechanisms will be divided into the following main divisions, namely, frame, item wheel carriage and item wheels, key mechanism, actuating mechanism, printing mechanism, carrying mechanism, adding and substracting mechanism, total printing mechanism, multiplying and dividing mechanism, two column mechanism, and locking devices for the figure keys, operating keys, item wheel carriage, two column mechanism and printing mechanism.

Frame.

The frame-work of the machine may be subdivided into four sections; the lower section consists of the base plate 1, side plates 2 and 3 and the bracket 4. See Fig. 5. The key-board section consists of the side plates 5 and 6 and the bracket 7; the side plates rest on the base plate and are screwed down to same. See Fig. 4. The upper section is in two parts, one carrying the transferring and printing mechanism and the other the totalizing mechanism. It consists of the side plates 8 and 9 and the bracket 10; the front ends of the upper section side plates have lateral projections which rest on the left side plate 3 of the lower section and on the supporting bracket 11, and the rear ends thereof rest on the bracket 4. See Figs. 5 and 17. The totalizer section consists of the side plates 12 and 13, the tie shaft 14, and the shaft 15 on which the total wheels are mounted, which also acts as a tie-member. The outline of this section is best shown in Fig. 3. It is mounted on the side plates of the upper section, and is held in position by screws 16 as shown in Fig. 6.

Item wheel carriage and item wheels.

The item wheel carriage consists of the body piece 26 and the side plates 27 and 28 fastened thereto. See Figs. 7 and 9 to 11. The body piece is hollow and has two rollers 29 supporting it on a shaft 30, inserted through the hollow portion of the body, and which is mounted in the frame-work of the machine. The upper parts of the carriage side plates are guided by a shaft 31 which is also mounted in the framework. The item wheels 32 are loosely mounted on shaft 33, and each item wheel has a spiral spring 34 connected to it near its hub, the other end of each of these springs being connected to a spring bar 35 which passes through the concentric slots 47 in the item wheels. The ends of the shaft 33 and spring bar are fixed in the carriage side plates. A hollow flange 36 on the item wheel serves as a casing for the spring. These springs tend to rotate the wheels away from normal position. Each wheel has a stepped disk 37 fastened to it, which cooperates with the corresponding one of a series of retaining pawls 38 mounted on shaft 39. Each of the steps of the stepped disk 37 subtends one tooth space on the pitch circle of the item wheel, i. e. if the retaining pawl is depressed so that the item wheel will rotate until the fifth step of the disk will strike it, the wheel will have rotated five teeth. Normally the retaining pawls rest on the innermost step, as shown in Fig. 11, and are held in this position by springs 40 on rod 41. A series of disks 42, carrying visible numbers, are arranged on a rod 48 secured at its ends in the side plates of the carriage. These number disks are in mesh with the item-wheels, and denote the number of teeth the various item wheels have escaped, i. e. visually display the item "set up." The retaining pawls 38 have a series of ten notches 49, corresponding with the ten positions they may assume, and the lock pawls 43 mounted on shaft 44 are arranged so that they may engage these notches and lock the retaining pawls. The rear arms of the lock pawls form cams terminating in a dwell, and are arranged to be actuated by the plate 45 inserted into the shaft of the small rocking frame 46, journaled in the carriage side plates. By means hereinafter described the frame 46 is oscillated until the plate is on the dwell and against the shoulder on the pawls. With parts in this position the retaining pawls are locked against the tension of their springs, and against actuation by the figure keys. If the retaining pawls are locked in this manner after an item has been "set up" on the item wheels, these may be returned to normal position and will then, under the impulse of their springs, rotate to their former "set up" position against the retaining pawls. This arrangement is useful for purposes of multiplication and division as hereinafter explained.

Key mechanism.

Figure 8:
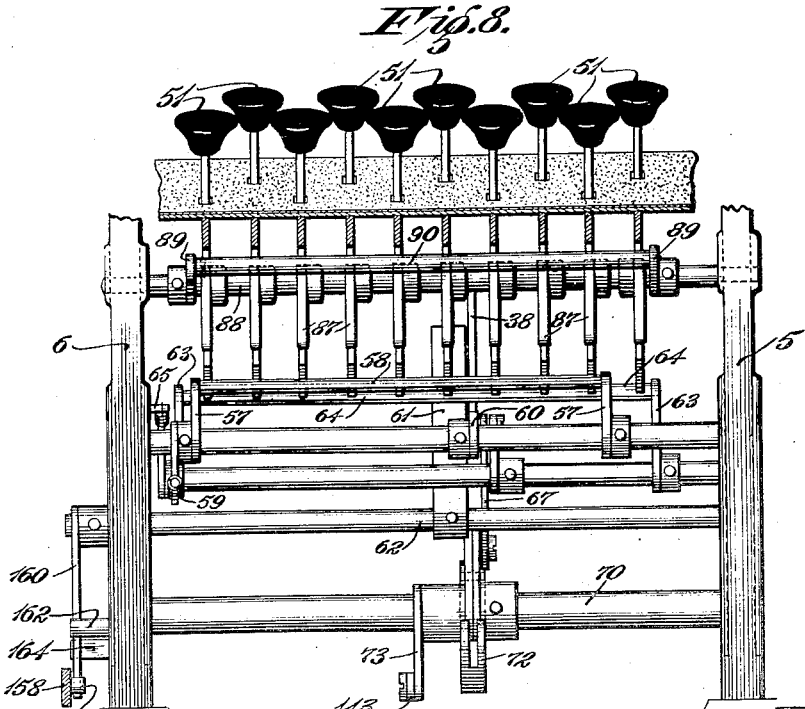
Fig. 8 is a front detail view of the key mechanism and key-repulsing device.

The figure keys 51 are mounted on shaft 52 supported in the key-board side plates, and are held in normal position against the stop bar 53, by springs 54. See Figs. 7, 8 and 9. The downward extension 55 of each key has a cut-out portion forming a cam 56 with a short dwell at the bottom. The amount of throw of the cam varies according to the figure of the key, the nine key having nine times the throw of the one key. A rocking frame 57 carrying a swinging shaft 58 is journaled in the side plates and is held in normal position by a spring 59. The shaft 58 is rotatingly mounted in the frame 57, and is in position to be engaged by any one of the aforesaid key cams 56 after the respective key has been depressed a short distance. By these means, upon depressing a figure key the rocking frame is rocked in proportion to the figure of the key depressed. A set lever 60 is mounted on the rocking frame 57 and normally is in such position that the retaining pawls 38 of the item wheels may be successively brought, by the lateral movement of the item wheel carriage, to stand vertically over the set lever to be actuated thereby. A grooved plate 61, mounted on the shaft 62, is adjacent to the set lever 60 on the left hand side thereof. The corners at the right hand ends of the grooves therein are chamfered to facilitate the entering therein of the ends of the pawls 38 after leaving their position above the set lever. The object of this plate is to hold the retaining pawls 38 in set position for an appreciable length of time in order to give the item wheels corresponding thereto ample time to assume their set positions under the impulse of their springs. This movement occurs whenever a key is sufficiently depressed to actuate the escapement of the carriage, as will be described hereinafter. According to the key actuated, the pawl 38 is raised to come in line with one or another of the grooves on plate 61, and after having entered same will be held in position thereby. The width of the grooved plate 61 is such that each retaining pawl 38 which travels into engagement therewith at the end of the stroke of the figure key which set it, will remain in engagement with its groove in the plate 61 until the carriage is again escaped by the operation of a figure key, whereupon it will travel clear of the plate.

*The carriage escapement.*

A rocking frame 63 carrying a swinging shaft 64 is oscillatingly mounted in the keyboard side plates parallel to and spaced slightly from the frame 57 and shaft 58. The frame 63 is held in normal position by a spring 65, with the shaft 64 against the lower ends of the extensions 55 of the figure keys, which are shaped to form cams 66 with dwells at their lower ends. These cams are alike on all keys, and when a key is depressed it moves the swinging shaft 64, rotatingly mounted in the rocking frame 63 mentioned above. A link 67 connects an arm on the rocking frame with the escapement jaw 68. There are two escapement jaws, 68 and 69; the upper jaw 68 is tight on the shaft 70 and the lower jaw 69 is loose thereon. Each of the jaws has a radial slot and the two slots are in line. The pin 71 in a link 72 enters through the two slots and thereby locks the two jaws together so that they ordinarily move as a unit. The link 72 is pivotally mounted on a lever 73 tight on a shaft 74. Near the left side plate, a lever 75 is mounted on the shaft 74 and a spring 76 holds it against a stop pin 77. The slot in jaw 69 is widened at the bottom so that if the link 72 is pulled forward and the pin 71 is moved to the widened portion of the slot, by means hereinafter described, the jaw 69 can have movement away from the jaw 68. The escapement jaws coöperate with the toothed bar 78 mounted on the carriage body piece 26. Normally the jaw 69 is in engagement with the toothed bar, in the position shown in Fig. 7. The down stroke of a figure key causes this jaw to be moved out of engagement therewith, as shown in Fig. 9, permitting the escapement of the carriage one-half of a unit space. The up stroke of the figure key allows the spring 65 to oscillate the jaw back to normal position, and permits another one-half unit space escapement of the carriage, thereby completing one unit travel thereof. The spring 79 which moves the carriage is connected in the following manner: A link 80 connects the carriage body with the lever 81 having a hub 84 which is fulcrumed on a stud 82 mounted on the base of the machine. See Figs. 10 and 17. A lever 83 is fastened to the lower end of the hub 84, and the tension spring 79 is fastened to this lever 83 at one end, the other end being hooked to the pin 85 on the base plate near the front end of the machine.

*Repulsing device for the key.*

Speedy operation of the keys is greatly facilitated by arranging that any key can be depressed while another key is rising to normal position. To avoid interference of moving parts, it is necessary to provide positive acting means to raise the key first depressed a certain distance by the movement of another key being depressed. A key repulsing device is provided for this purpose. The finger keys each have a cam projection 86 which coöperates with one of a series of pawls 87. These pawls are tight on a shaft 88 journaled in the key-board side plates, and the end plates 89 fastened to this shaft carry a swinging rod 90 arranged immediately below all of the finger keys. The parts are so arranged that when a key has been depressed to such an extent that the highest point of the cam projection is at the point of the corresponding pawl, the key body will just touch the shaft 90, and the continued depression of the key will carry the shaft down and set its corresponding pawl 87 above the cam projection 86 of the key so operated; the pawls 87 for all the other keys will be below the cam projections thereon. If now, with one key down, pressure is exerted on another key and the pressure on the first key relaxed, then the second key will act on its pawl 87 and through the shaft 90 push or raise the depressed key from low position, *i. e.* the descent of the second key forces the first key to ascend; furthermore, the first key must be raised to a certain position before the second key can continue its descent. This position is reached when the highest point of a cam projection 86 is at the point of the corresponding pawl 87, and this is the meeting point of a key in the act of ascending and a key in the act of descending. At this point, the ascending key has reset to normal position the devices actuated by all the keys, and at this point the descending key takes hold of these devices to actuate them. With the exception of the actuation of the repulsing device the downward key travel is idle to this point, the dwells on cams 56 and 66 mentioned above being provided for this purpose.

Actuating mechanism.

The foregoing describes the devices actuated to set up an item in the machine, and now the devices actuated to enter the same, clear the item wheels, and reset the carriage will be described. The operating lever 101, by means of the link 102 and the lever 103, oscillates the shock spring shaft 104. See Fig. 2. The drive collar 105 mounted centrally on this shaft 104 transmits this movement to the shock spring 106. See Figs. 38 and 39. The two ends of this spring rest against the levers 107 which are loose on the shaft 104 and hold them against the stop levers 108 which are tight on the shaft 104. See Fig. 14. As the parts are arranged, the movement of the operating lever is transferred through the spring 106 to the levers 107, and as all further connections are made to these levers, it will be seen that if the resistance of the mechanism driven by these levers is greater than the tension of the spring 106, the spring will flex and the operating lever will be ineffectively actuated. The shock spring is so adjusted, that if the operating lever is operated above a certain speed the spring will momentarily flex and cause the mechanism driven by it to lag behind; thereby avoiding shocks to the mechanism.

The connecting links 109 connect the levers 107 to the levers 110 and 111 mounted on the main shaft 112. Toward the left on this shaft a lever 113 is mounted, and a spring 114 has one end connected to this lever and the other end connected to a bracket 115 on the base plate of the machine. This spring has as its function to retract the operating lever and all parts connected thereto to normal position. A dash-pot 116 is provided to regulate the speed and absorb the shock caused by the action of the retracting spring. The rear end of this dash-pot is pivotally mounted on a bracket 117 on the base plate of the machine and the piston connects to a lever 118 on the shaft 112.

Full stroke device.

To compel the operating lever to make a complete forward and return stroke, and thereby to insure a complete cycle of operations, a full stroke device is provided. See Fig. 3. On the left end of main shaft 112 a lever 119 is mounted, and pivotally mounted thereon is the four armed pawl 120 and the pawl 121 which is held by its spring 122 in coöperative relation with the downward extending arm of the pawl 120, to hold the same in either of its two positions. Two arced plates 123 and 124 are mounted side by side on the frame. The arced plate 124 has notches to coöperate with the rear arm of pawl 120 to prevent a return movement of the lever 119 when it has started on its forward travel. In a like manner the arced plate 123, has notches to coöperate with the forward arm of pawl 120 to prevent forward movement of the lever 119 after it has started on its return travel. The upward extending arm of pawl 120 coöperates with the two pins 125 on the arced plate 124 to reverse the pawl at the end of each stroke.

Item-wheel resetting and entering mechanism.

Links 126 connect the levers 107 to the levers 127 fulcrumed on the inside of the side plates, and these levers 127 are connected by links 128 to levers 129 which are likewise fulcrumed on the side plates and in line with the axis of rotation of the item-wheels. A bar 130 is mounted at its end on these levers 129 and extends through the concentric slots 47 in the item-wheels. The normal position of this bar is near the upper ends of the respective item-wheel slots 47, and when the item-wheels are "set," the other ends of the slots therein approach the bar. See Figs. 7, 14 and 15.

The parts are so arranged that the operating lever, through the means described, moves the bar 130 through a circular arc, concentric to the item-wheels, sufficiently to strike the ends of the slots 47 and rotate to normal position any item-wheels that may have been set. The operating lever is operated by a quick pull forward until the lever 103 strikes the stop pin 131; it is, however, undesirable that the bar 130 be brought to an abrupt stop, as this would cause a shock in all parts driven thereby. The above described linkage, which drives the bar 130, is therefore arranged to give the bar movement of decreasing velocity. The links 128 which drive the levers 129 arrive at the dead center shortly before or at the end of the stroke of the operating lever, and therefore the levers 129 and the bar 130 come to a gradual stop while the operating lever continues its movement for a short distance. Another purpose accomplished by this arrangement is to neutralize the increased resistance met by the bar 130 on its travel. During the first part of its travel, the bar will rotate only such wheels as have been escaped or set to nine position, then those set to eight position, etc., and at the last part of its travel it will rotate all item-wheels that have been set, no matter to what position. The bar 130 is arranged to travel idle for a short distance before engaging wheels that have been escaped to nine position; this is to provide time to establish a connection between the item-wheels and the devices actuated thereby, prior to rotating the item-wheels.

*Carriage retracting device.*

A bevel gear sector 132 is mounted on the hub 84 on which lever 81, which has been mentioned in conjunction with the propelling means of the carriage, is mounted, and a bevel gear sector 134 is mounted on a bracket 135 and is in mesh with the sector
132. See Figs. 7, 9 and 10. By reason of these connections an escapement of the carriage will cause a step by step movement of these parts.

A lever 136 is fastened to the sector 134 and a pawl 137, mounted on a lever 138 having the same fulcrum as the lever 136, is in line with the lever 136 and is arranged to engage the upper end thereof. The lever 138 is connected by a link 139 to lever 140 on the shaft 112 oscillated by the operating lever. A spring 141 normally holds the pawl down in the path of lever 136. Tight on the shaft 70 on which the escapement jaws are mounted, is a lever 142, and a link 143 connects this lever and the three armed lever 144 pivoted on bracket 11. The rearward arm of this lever 144 has a pin 145 which engages the lower edge of a wide slot in a lever 146 mounted on the bracket 135.
This lever 146 has a curved extension which extends under the point of the pawl 137, for the purpose of raising and holding the same out of the path of the lever 136 whenever a finger key is actuated. A three-arm pawl 147 is mounted on the bracket 135; the lower arm coöperates with the lever 146 to hold the same in set position, the upper arm has an actuating spring 148 to accomplish the aforesaid purpose, and the rear arm is actuated by the lever 138 to disengage the lower arm from the lever 146. Normally parts are as shown in Fig. 7. The pawl 137 is in the path of lever 136 and the lower arm of the pawl 147 is out of engagement with lever 146. The operation of a finger key will oscillate the lever 142 and depress the front arm of lever 146 and raise the rear arm thereof. This will raise the point of the pawl 137 out of the path of lever 136 and the pawl 147 will hold the lever 146 in set position by engaging the shoulder thereon, as shown in Fig. 9. This leaves the carriage free to escape step by step.

When the operating lever is actuated, the lever 138 is oscillated and the end of it will strike the rear arm of pawl 147, thereby disengaging same from lever 146. The rear end of the lever 146 will, under the impulse of the pawl spring 141, swing down slightly and the pawl 137 will be lowered into the path of lever 136. On the return stroke of the operating lever 101, the pawl 137 will engage the lever 136 and return it and thereby the carriage, to normal position.

In a previous paragraph it has been described how the carriage is laterally moved or escaped to position the item-wheels, by the oscillation of the escapement jaws 68 and 69. Means are provided to open these jaws so that the carriage can be retracted. See Fig. 14. To move the interlocking pin 71 in lever 72, to the lower end of the slots in the escapement jaws, a lever 149 is mounted on the shaft 74 where it extends through the key-board side plate. A pin 150 is mounted on this lever 149 and a lever 151 on the shaft 152 has an extension 153 which engages the pin 150 and opens the escapement jaw lock when the lever 151 is oscillated. To hold the lock in open position a retaining pawl 154 is pivotally mounted on the side plate and is arranged to engage a pin 155 on lever 149. An actuating spring 156 is connected to the rear arm of the retaining pawl 154. The lever 153 has an extension 157, which normally holds the retaining pawl 154 out of engagement with pin 155 on lever 149, but when the lever 151 is oscillated the retaining pawl is free to engage and retain the pin. A link 158 connects the lever 151 to a lever 159 mounted on the shaft 112 oscillated by the operating lever. The parts are so arranged that at the end of the initial or forward stroke of the operating lever, the lever 151 is oscillated sufficiently to move the lever 149, and the escapement is set to open position; and at the end of the return stroke of the operating lever the pawl 154 is released and the escapement jaws are closed and locked, the carriage being retracted to normal position by the bevel gear sectors and lever 81 during the return stroke of the operating lever.

In a previous paragraph it has been described how the item-wheel pawls travel into the grooves of the plate 61 to be held in position thereby. Means actuated by the operating lever are provided to oscillate the plate 61 to thereby release the last pawl engaged therewith, so that the pawl can engage and relock the item-wheel in normal position. The shaft 62 extends through the left side plate and a lever 160 mounted thereon is engaged by the pin 161 on link 158 and is held by this pin in normal position against the stop pin 162 on the side plate as shown in Fig. 14. Whenever the operating lever is actuated and the link 158 moves rearward, the pin 161 will release lever 160 and the pin 163 on link 158 will push lever 160 against the stop pin 164, thereby disengaging the plate 61 from any pawl 38 engaged therewith.

*Item transferring mechanism.*

To the rear of the item wheels are a series of connecting gear-sectors 166 rotatably mounted on the shaft 167 in the rocking frame 168 carried by the shaft 169. See Fig. 7. The shaft 169 carrying the rocking frame is mounted in the side plates and the right end protrudes through the side plate and carries a lever 170. See Figs. 16 and 25. Pivotally mounted on this lever is a pawl 171, the lower arm of which has a spring 172 connected thereto which tends to hold the toe of the upper arm rearward in engagement with the upper corner notch in a segment 173. The pawl 171 carries a pin 174, projecting from its upper end on the face toward the side plate, in line with and slightly below the apex of a wedge shaped pin 175 mounted on the side plate. A cam plate 176 is mounted on the segment and a pawl 177 is pivoted on the side plate with its free lower end suspended between the cam plate 176 and the pin 174. A link 178 connects the segment 173 with the lever 179 fixed on the shaft 112. See Fig. 25. The parts are so arranged that the oscillation of the segment will raise the pawl 171 and as soon as the center of the pin 174 in this pawl has passed the edge of the wedged shaped pin 175, the cam plate 176 on the segment will oscillate the pawl 177 and this pawl will push the pin 174 forward onto the upper edge of the wedge shaped pin 175, thereby gradually disengaging the pawl 171 from the segment 173. When this is accomplished, the pawl 171 will ride on the concentric surface of the cam plate 176, thereby holding the pawl in upper or set position. The segment oscillates upwardly far enough to bring its lower corner notch opposite the toe on the pawl 171, and to allow the retaining pawl 177 to ride off the end of the cam plate, thereby releasing the pawl 171, which will drop off the wedge pin under the action of the spring 172. The return oscillation of the segment will force the pawl 171 down and the pawl 177 forward, carrying the toe of the pawl 171 out of engagement with the segment and permitting the latter to return to its normal position, as shown in Fig. 25.

*Error key.*

An error key is provided to prevent the engaging movement of the connecting sectors 166 so that in case a wrong figure has been struck on the keys, the item wheels can be reset without entering this movement.

The lower end of the error key 181 is connected to the lever 182 mounted on shaft 183 which extends to the right side of the keyboard. See Fig. 16. The spring 184 holds the error key in normal position with the stop pin 185 against the key-board plate. A lever 186 is mounted on the right end of shaft 183 and a link 187 connects this lever with a lever 188 on shaft 189 mounted in the brackets 190 and 11. An upward extending lever 191 is mounted on shaft 189 and a pin 192 thereon is arranged to coöperate with the lower arm of pawl 171. The parts are so arranged that when the error key is depressed, the pin 192 will engage and oscillate the pawl sufficiently to disengage the toe on the upper arm from the sector 173, so that when the sector is oscillated by the actuation of the operating lever the pawl will not be raised and the connecting sectors will not be engaged. A retaining pawl 193 and a spring 194 are provided to hold the error key in depressed position until the operating lever has completed its forward stroke. At or near the end of the forward stroke of the operating lever, the extension 157 on lever 151 will engage the forward arm of pawl 193 and disengage it from the error key. See Fig. 3.

*Gear trains.*

The oscillation of the rocking frame 168 by the above described means causes the sectors 166 to engage such of the item-wheels 32 as have been moved into alinement with the total wheel gear trains by the movement of the item wheel carriage from normal lateral position, and simultaneously to engage all of a series of gears 200 which are mounted on the shaft 201. See Figs. 7 & 17. This shaft, including the gears thereon, is laterally shiftable by the operation of the adding and subtracting key to set the gear trains in either adding or subtracting position, as will be more fully described. Above these gears 200 is a series of larger gears 202 and above these are the total wheels 203. To the rear of gears 200 and 202 are a series of ten toothed pinions 204 which are permanently in mesh with the gears 202. The parts are so arranged that when the machine is set in adding position, the gears 200 engage the gears 202 and are out of engagement with the pinions 204 as shown in Fig. 26, and when set in subtracting position, they are in engagement with the pinions 204 and out of engagement with the gears 202, as shown in dotted lines in Fig. 26. The gears 200 are always rotated in the same direction by the sectors 166, and the pinions 204 act as intermediate gears to reverse the direction of rotation of the total wheels 203. For purposes to be described hereinafter, the four left hand gears 200 are not mounted directly on the shaft 201 but on a sleeve 536, and are shiftable therewith to be set in neutral position where they will not be engaged by the connecting sectors 166. Each gear train comprises a numeral disk 223 to indicate the position of the total wheel.

*Alining device.*

An alining device to aline the gear teeth of the gear trains is provided so that gears 200 can readily be shifted from adding to subtracting position and vice-versa. A shaft 205 mounted in a rocking frame 206 normally engages the tooth spaces of pinions 204. See Fig. 7. The shaft 207 of the rocking frame extends through the left side plate and a lever 208 is mounted on this extension. See Fig. 3. A lever 209 is pivotally mounted on the left side plate and a pin 210 thereon normally engages the lever 208 and holds the shaft 205 in engaged position. A link 211 connects the lower arm of lever 209 with a lever 212 on the main shaft 112, oscillated by the operating lever as previously described. The parts are so arranged that when the operating lever is actuated, the rocking frame is released and the alining shaft disengaged from the tooth spaces, and at the end of the return stroke of the operating lever it is reëngaged.

*Train lock.*

To prevent accidental movement of the gear trains, lock pawls 213 are provided to engage the total wheels 203. See Fig. 7. These lock pawls are loosely mounted on a shaft 214 whose ends are supported by members 215 of a rocking frame. These side members 215 are fixed on a shaft 216 mounted in the side plates of the carrier section. The rear ends of the lock pawls 213 normally rest on the peripheries of cam disks forming part of the carrying mechanism. A link 217 connects the rocking frame for the lock pawls with the oscillating frame 168 in which the connecting sectors 166 are mounted, so that when the oscillating frame is oscillated to connect the connecting sectors with the item wheels and gears 200, the rocking frame for the lock pawls 213 is rocked to disengage the lock pawls from the total wheels, so these are free to receive movement from the item wheels.

The lateral movement of the item wheel carriage determines the number of item wheels that will be brought into operative connection with the gear trains, and such gear trains as are connected with the item wheels, are thereby locked, and accidental movement of the same by hub friction or otherwise is impossible. Lock devices are provided to prevent accidental movement of gear trains not interlocked by item wheels. See Figs. 7, 9 and 17. The lock pawls 213, except the first one to the right, have projections 218 which coöperate with a like number of lock sectors 219 tight on shaft 220. A link 221 connects the lever 222, also tight on the shaft 220, to the bevel gear sector 134, which is moved step by step by the escapement of the carriage as previously described. When the parts are in normal position, as shown in Fig. 7, the lock sectors 219 are in ineffective position, i. e., to the front of and out of engagement with the projections 218 on the lock pawls, and these are free to disengage the total wheels when the connecting sectors 166 are engaged with the shift gears 200. When the carriage is escaped one unit, the lock pawls 213, except the first one to the right, are prevented from disengaging the total wheels when their rocking frame is oscillated, as shown in Fig. 9. This oscillation merely causes the rear ends of the pawls to swing away from the disks 328. When the carriage is escaped another unit, the lock surface of the first lock sector to the right, which coöperates with the second lock pawl 213, is moved past the projection 218 on the lock pawl, and the two right hand lock pawls are free to be disengaged by the oscillation of their rocking frame. In the same progression as the carriage escapement is actuated and the carriage moved to bring additional item wheels into "set" position, the pawls, locking the corresponding total wheels, are successively unlocked by the lock sectors passing the projections 218 on the respective lock pawls.

*Printing mechanism.*

*Type-sectors.*

Links 226 connect the sectors 166 to the type sectors 227 mounted on shaft 228. Each type-sector carries a steel type strip 229 having embossed type. See Figs. 7 and 18. The upper end of this strip is passed through a slot in the bent over portion of the type-sector and its extremity is bent into a loop which loosely encircles the type-sector hub. The middle portion of the strip is bent down at right angles and curved to the form of a circular arc, concentric to the type-sector fulcrum. On this portion the embossed type are arranged. The lower end again is bent into a loop which loosely encircles a lug 230 on the type-sector. The two ends of the type strip are fastened by being inserted behind pins 231 which jam them against the type sector hub and hub 230, respectively. The two loops form springs, so that the curved type portions can move rearward under the impact of the hammers to a sufficient extent to print, after which they will be brought back to normal position by the spring action of the loops. A grooved bar 232 acts as a spacing bar for the type strips. The parts are so arranged that the movement of the connecting sectors 166 through one tooth space moves the type-sectors to the extent of one figure on the type strips. As previously described, the connecting sectors are connected and actuated during the initial or forward stroke of the operating lever and disengaged at the beginning of the return stroke. To return the connecting sectors and type-sectors connected thereto to normal position the following devices are provided: A flat bar 233 is mounted in a rocking frame 234, whose side members are tight on shaft 228. The bar extends through concentric slots in the type sectors and normally holds the type-sectors against the stop bar 235. A lever 236 is mounted on the right end of the shaft 228 which extends through the side plate. See Fig. 2. This lever is connected by a link 237 to the gear sector 238. A link 239 connects the sector 238 to the bell crank 240, which is oscillated by means of a link 241, from the lever 242 fixed on shaft 212, actuated by the operating lever as described before. The rocking frame 234 and bar 233 begin swinging down to release the printing sectors at the very beginning of the forward stroke of the actuating lever, thus allowing the printing sectors to respond to the movement of the respective connecting sectors 166, which cannot move until after the rocking frame mechanism has thrown them into gear with the item wheel.

*Alining device for type-sectors.*

An alining device is provided to aline and lock the type sectors in set position while printing takes place. Each type sector has ten notches cut in the outer edge of its concentric body portion, and a series of pawls 243 spaced on a shaft 244, each in alinement with a stype sector, are arranged to engage the notches in the type sectors. See Figs. 7 and 18. The pawls 243 and their shaft 244 are worked out of one piece, and the left end of the shaft extends through the left side plate and has a lever 245 mounted thereon. See Fig. 3. The lever 209 which is oscillated by the actuation of the operating lever as hereinbefore described, has a projection 246 with a concentric outline at its upper end. Near the end of the initial or forward stroke of the operating lever this projecting portion 246 will strike the lever 245 and force the alining pawls 243 into engagement with the type sectors. During the remainder of the forward stroke, the concentric surface of the projection will travel along the curved end surface of lever 245 and hold it in position until printing has taken place. The alining pawls will be released from engagement with the type sectors early in the return stroke of the operating lever. A stop pin 247 limits the movement of lever 245.

*Hammers.*

The printing hammers 248 are loosely mounted on shaft 249 and extend upward between the type strips. The printing hammer heads are offset and thickened to centrally engage the type strips. Each hammer has a two part drive lever consisting of a driving arm 250 integral with the hammer and a separate drive lever 251 loosely connected thereto and pivoted at its upper end on the hammer hub. This drive lever 251 has a pin 252 which extends through a larger hole in the short arm 250 of the hammer, so that the hammer can have a slight movement relative to the drive lever. A spring 253 is hooked on to the drive lever 251 and on to a spring shaft 254 common to all the hammer springs. A fixed stop shaft 255, with a flat contact surface, is provided for the drive levers to bear against when in normal position. To set or cock the hammers the following devices are provided: The shaft 249, on which the hammers are loosely mounted carries a rocking frame 256. See Figs. 5, 7 and 18. A series of drive pawls 257 are mounted therein, and springs 258 normally hold the pawls against the stop shaft 259 with their shoulders in contact with the ends of the drive levers 251, so that when the rocking frame swings to the rear, all the hammers are swung back or cocked thereby. To oscillate this frame, a lever 260 is mounted on the end of the shaft 249 which extends through the right side plate. See Fig. 2. A shouldered screw 261 in this lever normally engages the short horizontal portion of the L slot in the link 262 which is connected to the lever 242 on shaft 212 oscillated by the operating lever 101 as described before. The L slot in link 262 makes it possible to set the link in ineffective position to actuate lever 261, and thereby to avoid cocking the hammers when no printed record is desired. Means to lock the link 262 in either position are provided as will be described hereinafter.

The aforesaid drive pawls 257 have downward extending projections 263 arranged to coöperate with projections 264 on the rear arms of the trip levers 265 loosely mounted on shaft 266. The forward arms of these levers 265 normally rest on the cam plates 267 mounted on the type sectors and are held in this position by springs 268. See Fig. 7. The parts are so arranged that when the operating lever is actuated the cam 267 on each type sector which is moved depresses the forward arm of its trip lever 265 and raises the rear arm thereof to bring the projection thereon into the path of the projection on the drive pawl coöperating with the printing hammer for the sector so moved. Near the end of the forward stroke of the operating lever the drive pawl will strike the projection on the trip lever. This oscillates the pawl and disengages it from the drive lever of the hammer, which lever will, under the impulse of its spring, move quickly to normal position against the stop bar 255. The hammer, by reason of its movement relative to the drive lever, will continue its travel until the head has carried the type strip against the printing ribbon and platen to print the figure set in front of the hammer by the movement of the type sector.

*Transferring device for zero printing.*

When the type sectors are in normal position, the zeros on the type strips are in line with the hammers, but as the cams 267 and trip levers 265 are in normal position, the hammers will not be tripped, and the zeros will not be printed. To print zeros to the right of a significant figure the following devices are provided. The forward arms of trip levers 265 have short wide slots to receive pawls 269 pivotally mounted on levers 270 mounted on shaft 271. See Figs. 7, 18 and 37. All of these levers 270 except the fourth one from the left side are tight on shaft 271. The aforesaid fourth one is loose and has an arm 272 which is arranged to be actuated by a cam 273 on shaft 274. See Fig. 36. The purpose of this special lever will be explained hereinafter in conjunction with the printing of two columns of figures. The contact surfaces of the pawls 269 are curved so as to be free to oscillate in the slots of the trip levers. Each pawl has a pin 275 through its end which projects on both sides, and the projecting ends of which are halved. On the left side, the upper half of the pin is cut away and on the right side the lower half of the pin is cut away. See Fig. 37. The pins are of such length that the right extension of one overlaps the left extension of the adjacent one, thereby establishing a connection between all the pawls and all the trip levers, so that if a trip lever is oscillated, which happens when the type sector corresponding thereto is set to print a figure above zero, all trip levers to the right thereof will likewise be oscillated, whether or not the respective type sectors are set, and this will cause their respective hammers to be tripped and print.

*Printing platen, and paper-feed.*

As previously stated, printing is accomplished by the hammer striking the type strips and carrying the same against the ribbon and platen. A guide rail 276 is mounted across the rear of the casing 277, and slidingly mounted thereon is a frame 278 carrying a rotary platen 279. See Figs. 19 and 20. The platen is fitted with guiding means for the paper such as is ordinarily provided in typewriters, and may be turned by hand to feed the same. On the right side of the platen a ratchet wheel 280 is fixed. This ratchet forms part of automatic means to rotate the platen for line spacing, and is intermittently advanced by a pawl 281 carried by an oscillating arm 282. The pawl is kept in engagement with the ratchet by a spring 283, and another spring 284 retracts the oscillating arm. In order to oscillate the arm in any lateral position the frame may be moved to, the following devices are provided. The shaft 285 upon which the oscillating arm 282 is mounted is journaled in the frame 278. A plate 286 is inserted lengthwise in one side of this shaft and extends nearly the entire width of the frame. A lever 287 is pivotally mounted on the side plate of the upper section of the machine frame, and its free end extends through the casing and bears against the plate 286. A link 288 connects this lever to the lever 260 which is actuated whenever the hammers are cocked, as previously described. See Figs. 2 and 16. The parts are so arranged that when the operating lever is actuated and the hammer lever is oscillated, the lever 287 will release the plate 286, and the spring 284 connected to the oscillating arm will cause the arm to oscillate and move the feed pawl back one tooth, at which point the oscillating arm will strike the stop 289. During the return stroke of the operating lever, the lever 287 will return the plate and oscillating arm to normal position and thereby cause the pawl 281 to move the platen forward one tooth.

*Printing ribbon.*

A two colored printing ribbon 290 is carried on two spools 291 mounted on brackets 292 fastened to the two sides of the casing near its top at the rear. The spools are so placed that the ribbon must cross the printing points of all the type strips. A feed mechanism is provided to roll the ribbon off the right hand spool onto the left hand spool. The left end of the hammer supporting shaft 249 extends through the side plate and has a threaded hole in its end. See Figs. 3 and 20. An extension shaft 293 is arranged to be screwed into the shaft 249 after the casing is set in position. A lever 294 is loosely mounted on this extension shaft and carries a feed pawl 295. A spring 296 connects the rear end of the feed pawl to an arm on lever 294 and holds the pawl in engagement with ratchet teeth 297 cut into the lower plate of the ribbon spool. A drive disk 298 is fixed on the end of the shaft extension 293 and has a wide notch in its periphery in which engages a pin 299 on the lever 294. The parts are so arranged that the operating lever on its forward stroke oscillates the drive disk and sets the feed pawl a tooth forward, and on the return stroke, resets the parts to their normal positions and thereby causes feeding movement of the spool and ribbon. As the drive disk has more movement than is required for the movement of the lever 294, its movement is arranged to be partly idle by adjusting the width of the notch therein accordingly. To rewind the ribbon, the feed pawl is disengaged by depressing its front extension, and the right hand spool is manually revolved by the finger piece 300 loosely mounted on the spool.

Carrying mechanism.

The total wheels 203 are 20 toothed gears and are mounted for rotation in either direction on the shaft 15, as previously described. To carry a unit from one total wheel to the total wheel of the next higher order, as must be done in addition and subtraction respectively, the following mechanism is provided: On the left side of each total wheel except the one at the extreme left of the machine a set disk 301 having two projections is mounted; and to the left side of this, a set lock disk 302 having two V-shaped notches, is mounted. See Figs. 7, 17, 22, 23, 24 and 30. The set disk and lock disk are both secured to the total wheel to turn therewith. To the rear of each of the total wheels, and attached disks, a cam actuated carrying lever 303 is mounted on a shaft 304. The lower part of this lever is cut down on the right side to half thickness and a part of the upper arm of this lever is cut down on the left side to half thickness, so that these two parts are offset relatively to each other. Two actuating cams 305 and 306, are mounted adjacent to each other on the actuating shaft 327 and the cam 306 is in line with the lower part of the carrying lever 303 and cam 305 is in line with the upper part of the lever 303. On the right side of the carrying lever 303 a set pawl 307 is mounted in line with the set disk 301 on the total wheel. A projection at the end of this pawl 307 normally rides on the periphery of the set disk, and a projection on the opposite side of the pawl normally rests with its point on the guide shaft 308, which is rotatably mounted in the side plates. The purpose of this shaft is to constrain the movement of the set pawl. Figs. 7 and 22 show all parts in normal position. Referring to Fig. 22, the rotation of the total wheel 203 one tooth space in adding direction will raise the set pawl and set the carrying lever in position to be actuated to carry the next total wheel to the left one tooth space. Fig. 23 shows a carrying train set in position to carry the adjacent train in adding direction.

The total wheel which sets this train, has revolved one tooth space in the adding direction from the position shown in Fig. 22, and stopped at zero. The set disk fixed to this total wheel has moved the set pawl upwardly setting the carrying lever in carrying position for adding, by the engagement of the projection on the set disk with the point of the set pawl, the rear projection on the set pawl riding on the top of the rod 308. The upper extension of the carrying lever bottoms on the depressed portion of the actuating cam 305 ready to be actuated thereby when the actuating shaft 327 is rotated. In Fig. 24 the total wheel which sets the train for addition remains in the zero position. The carrying lever is in half way actuated position, the upper extension thereof and the carrying pawl 311 pivoted thereto being moved halfway to normal position by the rotation of the actuating cam 305. It will be understood that the rotation of the total wheel in subtracting direction will set the carrying train in position to carry in subtracting direction, i. e., move the set pawl and carrying lever in a direction opposite to the one shown in Fig. 23, and the lower arm of the carrying lever will then bottom on the depressed portion of actuating cam 306, whereby the lever will be oscillated to throw the total wheel one space in the direction to subtract when the actuating shaft 327 is rotated.

To avoid the carrying lever 303 being accidentally set to carrying position, and to make sure that it remains in set position when set, and furthermore, to make sure that a train to be carried is carried, a number of locking devices are provided.

The upper part of the carrying lever 303 has three V-shaped notches, and the set lock pawl 309, which is pivotally mounted on the set lock lever 310, normally engages the central notch with the V-shaped end of its rear arm. The front arm of the pawl rides on the periphery of its corresponding set lock disk 302. The projections on the set disk 301 and the notches on the set lock disk 302 are so positioned that when a projection on the set disk engages the set pawl 307, a notch in the set lock disk presents itself to the V-shaped point of the front arm of set lock pawl 309. As the set disk moves the carrying lever 303 by means of the set pawl 307, the front arm of set lock pawl 309 slips into the notch in the set lock disk, and the rear arm thereof is raised out of the V notch in the carrying lever. When the setting operation has progressed half way, the front arm of the set lock pawl 309 will bottom in the notch in the set lock disk 302, and the rear arm will be entirely clear of the notch in the carrying lever 303. The continuation of the setting operation will force the front arm of the set lock pawl 309 out of the notch in the set lock disk and cause the rear arm to engage the adjacent V notch in the carrying lever 303. The notch so engaged depends on the direction in which the cam lever has been moved, being the front notch for adding and the rear notch for subtracting carrying movement. The total wheel, with its set disk and set lock disk, may now continue its travel; the periphery of the set lock disk 302 locking the carrying lever 303 in the position at which it has been set. The carrying lever 303 carries the carrying pawl 311, which engages and carries the adjacent total wheel when the carrying lever is reset to normal position by the actuating cam 305 or 306. In order to reset the carrying lever, it must be released from its locking means, i. e., the set lock pawl 309. The rear arm of set lock lever 310, on the front end of which the pawl 309 is mounted, rides on the periphery of a set lock releasing cam 312, mounted on the actuating shaft 327. This set lock releasing cam has a V-shaped notch and the parts are so positioned that when the carrying lever is actuated by the rotation of the actuating cams 305 and 306, the notch on the set lock releasing cam 312 presents itself to the rear arm of set lock lever 310.

When the resetting of the carrying lever 303 has progressed half way, the rear arm of set lock lever 310 will bottom in the notch on the set lock releasing cam 312, and the set lock pawl 309 will clear the notches in the carrying lever 303 entirely, as shown in Fig. 24. The continuation of the resetting or carrying operation, will relock the carrying lever 303 in normal position by the rear arm of set lock lever 310 being forced out of the notch in the set lock releasing cam 312. An engaging pawl 313 is arranged to be actuated by the actuation of the actuating cam 305 which coöperates with the upper part of the carrying lever 303, and a pin 314 in this engaging pawl engages the lower edge of the rear extension of the carrying pawl 311. The parts are so arranged that when the actuating shaft 327 is rotated, the engaging pawl 313 is forced out, thereby forcing the front arm of the carrying pawl 311 into engagement with the corresponding total wheel and holding it there during the resetting or carrying movement of the carrying lever 303.

The rotation of the actuating shaft 327 takes place during the return stroke of the operating lever, and during this period the connecting sectors 166 are out of engagement with the pinions 200, and the lock pawls 213 are held in engagement with the total wheels. In order to impart carrying movement to a total wheel, its lock pawl 213 must be disengaged. A lock pawl releasing disk or cam 328 having a V-shaped notch, is mounted on actuating shaft 327, and the rear arm of each lock pawl 213 ordinarily rides on the periphery of this disk. The notch in this disk is so positioned that when the carrying pawl 311 engages the total wheel for the purpose of carrying it, the notch presents itself to the corresponding lock pawl 213 and releases the total wheel, and again relocks it when carrying has taken place. For each total wheel, except the first or right hand one, there is a set lock releasing cam 312, two actuating cams 305 and 306 and a lock pawl releasing cam 328. See Fig. 29. These four cams form a set and there are 8 sets in the present machine. The set lock releasing cams 312 and lock pawl releasing cams 328 are identical in the several sets. The actuating cams, 305 and 306, have a different outline in each set, the bottom dwell being longer for each set in progression from right to left. Fig. 29 shows the outlines of the cams in the right-hand set. The outlines of the cams in the successive sets to the left of the right hand set are shown in dotted lines in Fig. 29. These sets are staggered or angularly displaced with respect to each other on shaft 307 so that they actuate in succession, one revolution of shaft 307 completing the cycle of operations of all eight. As the first total wheel to the right is not subject to carrying movement, its lock pawl does not require a releasing cam and therefore a plain disk 329 is used in lieu of it. See Fig. 7.

The shaft 327 extends through the right side plate and a disk 315 carrying a pawl 316 is mounted thereon. A spring 317 holds this pawl in engagement with a drive disk or single tooth ratchet 318 mounted on a pinion 319. See Figs. 2, 25 and 34. This pinion and drive disk are loose on shaft 327 and the pinion is in mesh with the large gear 238. The parts are so arranged that when the gear 238 is oscillated by the operating lever as hereinbefore described, the pinion 319 and drive disk 318 will rotate one revolution, first in one direction and then back. During the return rotation, the pawl 316 engages the drive disk and the pawl disk 315 is caused to rotate with the drive disk, thereby revolving the actuating shaft 327. To prevent over rotation of the shaft a disk 320 having a projection 321 is mounted on its left end, outside of the left side plate. A pawl 322 is pivotally mounted on the side plate and a spring 323 holds the upper arm of the pawl in engagement with the disk 320. A slotted link 324 connects the pawl 322 with the lever 209 oscillated by the operating lever as previously described. A retaining pawl 325 with a spring 326 is provided to prevent back rotation of shaft 327. The parts are so arranged that at the end of the initial stroke of the operating lever, the pawl 322 is disengaged from the projection 321 on disk 320 to permit the rotation of the shaft during the return stroke of the operating lever. The slot in the link allows the latter to drop the pawl to reëngage the disk as soon as the projection has traveled from under it, in good time to prevent over rotation of the shaft.

*Adding and subtracting mechanism.*

To shift the pinions 200 from adding to subtracting position and vice-versa the following devices are provided. The adding key 351 and the subtracting key 352 are mounted on a three armed lever 353 pivotally mounted on the key-board side plate. See Figs. 2 and 25. A pin 354 on the downward arm of this lever, engages a slot in the upper arm of a lever 355 pivotally mounted on the side plate. A notched spring latch pawl 356 is pivoted on the side plate to engage and latch the lever 355 in either of the two positions in which it can be set. A link 357 connects the lower arm of lever 355 to a lever 358 on a shaft 359 journaled in brackets 190 and 11. See Figs. 2, 17 and 25. A link 361 connects a lever 362 on shaft 359 to a bell crank 363 mounted on a stud 364 on the side plate of the upper frame section. A short link 365 connects the bell crank to the shaft 201 on which the pinions 200 are mounted. Two stop collars 366 are mounted on the pinion shaft 201, one outside and one inside of the side plate, to stop the movement of the pinion shaft in either direction by contact with the side plate. The notched spring lock pawl 356 takes up all lost motion in the connections and causes the stop collars to bear tight against the side plate.

With the parts in adding position as shown in Figs. 17 and 22, the shaft 201 is shifted to the right so that the left hand stop collar 366 bears against the inside face of the side frame, and the gears 200 mesh with the right hand edges of the gears 202 which rotate the total wheels, thus causing the total wheels and gears 200 to rotate in the same direction. See Fig. 26. With the parts in subtracting position the shaft 201 is shifted to the left so that the right hand stop collar 366 bears against the outside face of the side frame, and the gears 200 pass out of mesh with the gears 202 and into mesh with the gears 204 as shown in dotted lines in Fig. 26, thus reversing the direction of rotation of the gears 200 and total wheels with respect to each other. As the gears 200 are rotated in the same direction as the item wheels by the connecting gear sectors 166, the total wheels will be rotated in the same direction as the item wheels when the parts are in adding position, and in the direction opposite to that of the item wheels when the parts are in subtracting position.

*Subtracting character printing mechanism.*

A subtracting character type is provided and is arranged to be set by the operation of the subtracting key to print a minus sign or other character beside each item subtracted. See Figs. 5, 6, 7 and 25.

On the first or right hand hammer 248 a lug 369 is mounted, and in the same plane with it is the character hammer 371 pivoted on lever 372 mounted on shaft 373. This hammer carries the minus sign type on its striking face and is held against the stop pin 374 by spring 375. The shaft 373 extends through the side plate and a lever 376 mounted on the extending portion is connected to the small lever 377 on shaft 359 by the link 378. The shaft 359 is oscillated by the adding and subtracting key as hereinbefore described, and the oscillation of same by the subtracting key will raise the hammer 371 into the path of the lug 369. In this position, the actuation of the hammer which prints the first unit of the item will carry the character hammer forward to print a minus sign adjacent to the item.

*Total printing mechanism.*

As hereinbefore described, the accumulated total is at all times visually displayed on the numeral disks 223. In order to print the total the total wheels are rotated in reverse direction to zero position and the movement of each is transferred into the movement of the type sectors. The rotation of the total wheels to zero position is effected by the clearing mechanism, hereinafter described. Before clearing the total wheels the gear trains are set in subtracting position by depressing the total key, as hereinafter described, so that upon the actuation of the operating lever, the connecting gear sectors 166 will be thrown into mesh with the gears 200, and will be in operative connection with the total wheels through the reversing pinions 204 and gears 202. Now the rotation of the total wheels to zero by the clearing mechanism will transfer the angular movement of each total wheel through the gear trains and connecting sectors to set the printing sectors, and printing will take place in the same way as for printing an item entered from the item wheels. As the item wheel carriage is in its retracted position, none of the item wheels are engaged by the connecting gear sectors during the operation of transferring the total into the printing sectors.

*Total wheel clearing mechanism.*

To rotate the total wheels in reverse direction to zero position, thus clearing the total wheels of the accumulated total, the following devices are provided. A series of clearing pinions 381 are mounted tight on the clearing pinion actuating shaft 382 and in position to engage the ten toothed pinions 204. See Figs. 7 and 22. The clearing pinions are cut as ten toothed pinions, but have one tooth removed. See Figs. 27 and 28. The space resulting from the removal of the one tooth is normally so positioned that the reversing pinions 204 can be rotated without interfering with the clearing pinions 381. The ten toothed reversing pinions 204 have one tooth cut away on its side to such an extent that when the pinions are in normal or zero position they will not be engaged or rotated by the rotation of the clearing pinions 381 but if any other tooth on the reversing pinions 204 is in the position normally occupied by the mutilated tooth, the rotation of the clearing pinions will engage and rotate the reversing pinions 204 until the mutilated tooth is moved to normal position, that is, with its middle on a line from center to center of the two sets of pinions. As the reversing pinions 204 have ten teeth and the total wheels twenty teeth, the normal or zero position of the reversing pinions corresponds with either of the two zero positions of the total wheels.

To stop the total wheels in zero position at the end of the clearing operation the following means are provided: A shaft 383 is journaled in the side plates of the totalizer frame and a series of projections 384 thereon are arranged to coöperate with the set projections on the set disk 301 fixed on the total wheels. See Figs. 7, 22, 23 and 24. Whenever the machine is set to be cleared, as will be described hereinafter, the shaft 383 is slightly rotated to bring the projections 384 into the path of the projections on the set disks, which are rotated in subtracting direction with the total wheels, and thereby to stop them and the total wheels in the first zero position which is reached.

One revolution of the clearing pinions 381 will rotate the total wheels to normal or zero position irrespective of the figures at which they may be set, and this rotation is imparted to the pinion shaft 382 in the following manner: The shaft extends through the right side plate and a disk 385 is mounted tight thereon. See Figs. 2, 25 and 33. A pawl 386 is pivotally mounted on the disk and is arranged to coöperate with a single toothed drive disk 387 loosely mounted on shaft 382. A lever 388 normally engages the rear arm of the pawl 386 and holds it against the tension of the pawl spring 389, out of engagement with the drive disk 387 and in engagement with a lock pin 390 mounted in the side plate. A nine tooth pinion 391 is fastened to the drive disk 387 and an eleven tooth pinion 392 rotatably mounted on a stud 393 on the side plate is in mesh with pinion 391. A ten tooth pinion 394 is fastened to the eleven tooth pinion 392 and is in engagement with the large gear sector 238. See Fig. 33. The gear sector is rotated slightly more than ten teeth and the drive disk 387 is therefore rotated two or three tooth spaces more than one revolution. The rotation of the drive disk over and above one revolution is idle travel and is arranged at the beginning of the forward stroke of the operating lever to give the connecting sectors 166 time to engage the gears 200 before the same are rotated by the reversing pinions 204. In order to avoid shocks to the various parts by abrupt stoppage of movement, the clearing pinions are arranged to drive the gear trains, etc., with gradually diminishing velocity. To accomplish this, the connections from the operating lever to the gear sector are such as to impart rotative movement of gradually diminishing velocity to the gear sector. The pivotal connection of the link 239 and the gear sector 238 is moved until it gradually arrives at the dead center; that is, until it assumes a position central with a line from the fulcrum of bell crank 240 to the pivotal connection of the bell crank and the short link 239.

To avoid over rotation of the clearing pinion actuating shaft 382, the following devices are provided. See Fig. 3. The shaft extends through the left side plate and a disk 395 having a projection 396, is mounted thereon. A pawl 397 mounted on the left side plate is held in engagement with the disk by a spring 398 to prevent back rotation of the disk. A pawl 399, mounted on the side plates is normally held out of engagement with the disk 395 by a pin 400 on lever 209. The clearing pinion actuating shaft is rotated during the initial or forward stroke of the operating lever, during which stroke the lever 209 is oscillated away from the pawl 399. The pawl has a short dwell against which the pin 400 rides during the beginning of the stroke of the actuating lever, and will be released by the pin after the projection 396 has passed the shoulder on its other end. The spring 401 will move the pawl into engagement with the disk in sufficient time to stop the disk after one revolution by engaging the projection thereon. Near the end of the return stroke of the operating lever, the pin on lever 209 will engage a cam surface on the rear arm of the pawl and again disengage it from the disk.

*Total key.*

A total key is provided to set the machine in position to print the total and to clear the machine simultaneously by the actuation of the operating lever. The several operative functions of the total key are, to set the machine to subtracting position, to set the mechanism that clears the machine in effective position, to set the drive mechanism for the carrier in ineffective position, to shift the printing ribbon to print red, to set the zero stop shaft of the total wheels in position, and to lock the carriage, the adding key and the eliminating device against operation.

The lower end of the total key 402 is connected to the bell crank 403 and the upper part of the stem is guided by a slot in the key-board plate. See Figs. 2 and 25. A link 404 connects the bell crank to a lever 405 on shaft 406 journaled in brackets 11 and 190. See Fig. 17. A lever 407 tight on shaft 406 is connected to lever 388, controlling the drive for the clearing mechanism, by a link 408, and a link 409 connects lever 388 to one arm of pawl 410 mounted on the side plate. The pawl 410 is arranged to move the drive pawl 316 out of engagement with the drive disk 318 and into engagement with a lock pin 411, thereby setting the drive mechanism for the carrier in ineffective position and locking the shaft 327 against rotation. To retain the total key in depressed position when depressed and to release it when the operating lever has been actuated, the following devices are provided. Two retaining pawls 412 and 413 are mounted on the key board side plate and are arranged to engage suitable notches in the total key to retain it in depressed position. A spring 414 connects the two levers, and tends to hold them in engagement with the notches in the total key. Normally the parts are as shown in Fig. 25, and when the total key is depressed the pawl 412 will engage the notch in the total key, but the pawl 413 is held out of engagement by the projection 415 on link 416 engaging the pin 417 in pawl 413. The link 416 connects the lever 418 mounted on the side plate and the lever 419 mounted on the shaft 152, which is oscillated whenever the operating lever is actuated as hereinbefore described. When the operating lever is actuated, the link 416 will release the pawl 413, which will move into engagement with the notch in the total key, and at the end of the initial stroke of the operating lever, a pin 420 in the link 416 will have engaged and moved the pawl 412 out of engagement with the total key. When the pawl 412 is disengaged, the total key has a slight upward movement until stopped by pawl 413. This prevents the pawl 412 from reëngaging the total key when the link moves to normal position during the return stroke of the operating lever. At the termination of the return stroke of the operating lever, the pawl 413 is disengaged from the total key by the projection 415 on link 416, as previously described, and the total key will be moved to normal position by its spring 421.

Means are provided to set the machine in subtracting position when the total key is depressed and to reset it to adding position thereafter. If the machine is in subtracting position when the total key is depressed, it remains in this position thereafter.

A three armed pawl 422 mounted on the total key is adapted to engage with a notch and projection on the subtracting key 352, and is normally held out of engagement therewith by the stop pin 423 on the side plate bearing on the front arm of the pawl against the tension of the pawl spring 424. When the total key is depressed, the pawl 422 will enter the notch, engage the projection and carry the subtracting key down. The lower arm of the pawl is wedge shaped and coöperates with the wedge shaped pin 425 on the side plate. The point of the pawl will pass to in front of the edge of the pin and hold the pawl in engagement with the subtracting key, so that when the total key returns to normal position, the pawl will carry the subtracting key to normal position. If the subtracting key is in set position when the total key is depressed, the pawl 422 will bear against the edge of the subtracting key on its downward travel and the point of the pawl will pass behind the edge of the pin and will thereby be prevented from engaging the notch in the subtracting key. The total key will thereafter return to normal position without affecting the subtracting key.

Means actuated by the error key are provided for releasing the total key if the latter has been depressed by mistake. A lever 569 on the shaft 183, oscillated by the actuation of the error key as hereinbefore described, carries one end of a link 568. The other end of the link is slotted and loosely secured to the total key locking pawl 412 by a screw 572 passing through the slot. The slot is of sufficient length to allow the pawl to engage the total key to hold it in depressed position when the error key is in normal position, but when the depression of the error key swings the lever 569 and moves the link 568 away from the pawl a distance greater than the length of the slot, thereby holding the pawl away from the notch in the total key.

Ribbon shift.

A lever 426 is mounted on the shaft 406 journaled in the brackets 11 and 190 and oscillated by the total key as hereinbefore described. See Figs. 3 and 25. A shaft 427 is mounted in the side plates of the upper section and extends through on both sides. Two levers 428 and 429 are mounted on the right end of the shaft 427 and a lever 430 is mounted on the left end of the shaft. A link 431 connects lever 428 with lever 426 and oscillates the shaft when the total key is depressed. The links 432 have their lower ends connected to levers 429 and 430 and the upper ends are slidingly mounted on the side plates. Guide plates 433 are mounted on the bent over portion of the upper ends of the links. See Fig. 5. The ribbon is passed through the slots in the guide plates and the depression of the total key will raise the ribbon to bring the lower half of same, which is inked with a different color, in printing position.

*Zero stop.*

The zero stop shaft 383 has a small lever 434 mounted on its right end, and a pin 435 thereon engages a slot in the lever 436 pivotally mounted on the right side plate. A pin 437 on the link 409 engages a slot in the rear arm of lever 436. By these connections the zero stop shaft is oscillated and the stops set to arrest the total wheels in zero position whenever the total key is set.

*Subtotal printing mechanism.*

A subtotal is printed by reversing the total wheels to zero position and transferring the movement into the type sectors as in printing a total, and then resetting the type sectors to normal position and retransferring this movement into the total wheels. As the resetting of the type sectors occurs during the return stroke of the operating lever, operative connection must be maintained between the type sectors and the total wheels during the return stroke of the operating lever, in order to transfer movement from the former to the latter.

The subtotal key 441 is mounted on the left side of the key-board and its lower end is connected to a lever 442 on shaft 443. See Figs. 3 and 16. This shaft extends through the right side of the key-board and a lever 444 thereon is connected to a link 445, the rear end of which is connected to a lever 446 on shaft 447 mounted in the brackets 11 and 190. A lever 448 is tight on shaft 447 and its upper end engages the head of the screw which fastens the pawl 171 on lever 170. A pin 515 on the lever 448 engages the lower arm of pawl 171 and moves it backward when the lever 448 is raised, thereby carrying the pin 174 forward. The parts are so arranged, that when the subtotal key is depressed, the pawl 171 is raised to its upper position and the pin 174 is moved onto the top of the wedge pin 175, and held there during the return stroke of the operating lever; thus the connecting sectors 166 are kept in engagement with gears 200 during the return stroke of the operating lever. To print the subtotal, both the total key and the subtotal key are depressed and held down during the forward and return stroke of the operating lever, thereby maintaining the desired operative connection between the type sectors and the total wheels during the return stroke of the lever. When the subtotal key is released the spring 449 returns it to normal position with the stop pin 450 against the key-board plate. Means for retaining the total and subtotal keys in depressed position during the forward and return movement of the actuating lever is provided, as hereinafter described.

*Multiplying and dividing mechanism.*

The machine is provided with devices adapting it to repeatedly add or subtract an item without resetting the item wheels by the keys, and thereby to perform multiplication by repeated addition and division by repeated subtraction. Further, a register is provided to show the number of times an item has been repeated, *i. e.* the multiplier in multiplication, and the quotient in division. The repeat key 451 on the left side of the key-board is guided by a slot in the keyboard plate and held in normal position with the stop pin 452 against the keyboard by the spring 453. See Fig. 16. To hold the key in depressed position there is provided the three armed pawl 509, pivotally mounted on the left side plate of the keyboard section. After the stop pin 510 on the repeat key has passed below the latch on the upper arm of this pawl, the pin 511 on the repeat key strikes one arm of the pawl and sets the latch to catch the stop pin and hold the key in depressed position. To release the repeat key it is necessary to depress the error key, whereupon a pin 512 carried by the error key, engages the third arm of the pawl and unlatches it, thus allowing the spring 453 to return the repeat key to normal position. The lower end of the repeat key connects to the bell crank 454 and the link 455 connects the bell crank to the lever 456 on shaft 457. A plate 458, secured lengthwise in a slot in the shaft 457, engages the tooth spaces in the side plates of the small rocking frame 46 journaled in the carriage. A plate 45 secured in a lengthwise slot in the shaft of this rocking frame, sets the lock pawls 43 as previously described, to thereby retain a set up item in the item wheels whatsoever the lateral position of the carriage.

The repeat key also sets the carriage retracting means in ineffective position so that the carriage, with the set up item, remains in its lateral position; subject, however, to lateral movement by the zero and back spacing keys for multiplication and division, respectively. A cam 459 mounted on the shaft 457 is arranged to engage the lever 144 and hold it in such position that the pin 145 on this lever raises the retracting pawl 137 to ineffective position and holds it there. See Fig. 9. A slot in the end of the link 143 permits the lever 144 to be set by cam 459 without interferring with the operation of the carriage escapement.

The register.

A series of register wheels 460 are loosely mounted on the shaft 461 journaled in the plates 462 and 463, held together by tie-rods 464, 465 and 466, forming the framework of the register. See Figs. 2, 16, 17, 31 and 32. Each disk consists of a ratchet wheel 467 and a numeral ring 468 secured to the ratchet wheel. The ratchet wheel has a flange on which the numeral ring is mounted and this flange is partly cut away throughout the greater extent of its periphery, leaving a tongue 469 which has the twofold purpose of spacing the wheels and of being the engaging means for the resetting device. An actuating pawl 470 is slidingly mounted on the shaft 471 of a rocking frame formed by the side plates 472 fixed on a shaft 473 mounted in the register side plates. The hub of the pawl has a groove and the bifurcated lever 474 mounted on the right carriage side plate engages the groove in the pawl hub. Normally the pawl is to the right of the first ratchet wheel, but when the carriage is escaped one unit the pawl is moved by the lever 474 into position to coöperate with the first ratchet wheel, and in the same way when the carriage is escaped two units the pawl is moved laterally into line with the second ratchet wheel, and so on. A lever 475 is tight on shaft 473 of the rocking frame, and the link 476 connects it to the lever 110 on shaft 112 which is oscillated by the operating lever. A link 477 is connected to the link 476 and to the lever 478 on the shaft 457 which is oscillated by the repeat key. The front end of link 476 has an L-shaped slot in which engages the pin 479 on lever 475. Normally the parts are as shown in Fig. 16, i. e., the link 476 is in ineffective position to actuate the lever 475; but when the repeat key is set, the link 476 is moved down so that the pin 479 rests in the vertical part of the L-slot and the link is then in effective position to actuate the lever. The rear extension of the feed pawl 470 has a curved cam slot through which the tie-rod 466 extends, and the cam slot is so shaped that when the pawl is moved forward, it will, at the end of the forward travel, be forced into engagement with a ratchet wheel and at the end of its rearward travel be forced out of engagement therewith. See Fig. 32. During the rearward travel of the pawl, the particular ratchet wheel engaged is advanced one tooth. Retaining springs 480, inserted into the tie rod 464, are provided to prevent over rotation as well as reverse or accidental movement of the ratchet wheels. A plate 481 is inserted into the shaft 461 on which the register wheels are mounted, and projections 482 on this plate extend beyond the circumference of the shaft in such positions as to be adapted to coöperate with the tongues 469 on the ratchet wheels. See Figs. 17 and 32. Normally the tongues and projections are in the positions as shown in Fig. 32, and the pawl can move a ratchet wheel nine teeth before its tongue approaches the plate projections from the other side. Nine repetitions of one item are all that it is necessary to provide counting mechanism for in this machine, as it is simpler to multiply an item if it is to be repeated more than nine times.

To reset the register wheels, the shaft 461 is first rotated manually to the left until all the register wheels are in normal position, that is, show zeros through the opening in the casing, and then it is rotated back to the position shown in Fig. 32. A knurled knob 483, having a hollow stem arranged to fit over the extension of the shaft 461, is provided for rotating the resetting shaft. The stem has a pin 484, to engage the slot on the end of the shaft to insure a positive driving connection. This manual means is the only resetting means provided for the register.

Back spacing key.

A back spacing key 485 is provided to back-space the carriage step by step as is necessary in division. See Figs. 4 and 7. The key is slidingly mounted in the keyboard plate and the bracket 486 and is held in normal position by the spring 487. The lower end of the key rests on the lever 488 mounted on shaft 489 journaled in two small brackets 490 and 491. Mounted on the rear end of this shaft is a small section of a bevel gear 492 which engages notches in a plate 493 pivotally mounted on a bracket 494. See Figs. 10 to 13 and 17. On this plate the back-spacing pawl 495 is mounted, and is held in normal position by its spring 496. A spring 497 holds the bevel gear sector 492 and the parts connected thereto in normal position. The parts are so arranged that when the back-spacing key is operated, the pawl 495, which is normally out of engagement with the escapement bar 78 on the carriage, will engage the bar and move the carriage one unit toward normal position, and then reassume normal position upon the return of the back spacing key. In order to open the escapement jaws so the carriage can be back-spaced, and to relock them after the carriage has been moved the following devices are provided. A small cam lug 498 is provided on an extension of the back spacing key and coöperates with a pin 499 on the lever 500 mounted on bracket 486. See Fig. 7. The rearward extending arm of this lever engages the small lever 501 tight on shaft 74 which carries the means for opening the escapement jaws as previously described. The parts are so arranged that when the back spacing key is depressed the lug will throw the lever 500 backward and oscillate the shaft 74, thereby permitting the escapement jaws to open, and simultaneously therewith will back space the carriage. When the back-spacing key has reached its lowermost position, the termination of the cam lug permits the spring 76 to oscillate the shaft 74 and lever 500 back to normal position and to relock the escapement jaws. On the upstroke of the back spacing key, the cam lug will momentarily oscillate lever 500 forward against the tension of spring 502 and thereby again set the pin therein in proper engaging position with the cam lug.

Order lines.

As hereinbefore stated, to perform division, it is necessary to move the left figure of the divisor, set up in the carriage, under the left figure of the dividend, set up in the totalizing wheels, and also to back space the carriage from time to time. In order to determine readily the position of the divisor, relative to the dividend, order lines 506 are drawn on the casing as shown in Fig. 4. If for instance, the left hand figure of an item set up in the carriage is seen to be in the third order space, the item wheels are in position to coöperate with the three right hand totalizing wheels, etc.

Decimal point lugs.

Two small lugs 507 are arranged to slide on the bar 508 mounted on the casing below the openings exposing to view the total wheels and register wheels. See Fig. 4. These lugs represent decimal points, and are chiefly used in the operation of division to point off the zeros added to the dividend and the fractional part of the result, as already explained under the heading "Operation of machine."

Two column mechanism.
Splitting device.

In a previous paragraph it has been described how, by reason of a transferring hammer tripping device, the actuation of a type sector causes zeros to be printed on all type sectors to the right of the type sector actuated. A device is provided which can be set to modify the aforesaid device, so that the actuation of the left hand type sector causes zeros to be printed on the next two type sectors to the right thereof only. The actuation of the fifth type sector from the right, and sectors between it and the first, will cause zeros to be printed on all type sectors to the right thereof, as hereinbefore described. By reason of this device two columns of figures may be added; the left column comprising the three left hand type sectors and the right column the five right hand type sectors. The sixth type sector from the right is not used, so as to provide a blank space between the columns. The nine figures single column capacity of the machine is therefore split into two columns, of three and five figures respectively.

The knurled knob 526 on the left side of the machine has a hollow stem 527 which fits over the shaft 274, and the pin 529 in the stem engages the slot in the end of the shaft and constitutes the driving means. See Figs. 3 and 42. The flanged hub 530 mounted on shaft 528 has a portion of the flange removed, and a stop pin 531 in the side frame is arranged to limit the movement of the shaft in both directions by engaging the flange of the hub. A cam disk 273 is mounted on shaft 274 and engages the bell crank 272, which is held in normal position by a spring 532 and whose upper arm carries the sixth pawl 269 from the right. This pawl carries a halved pin 275 employed to transfer movement across the machine for printing zeros, as previously described. The rotation of the knurled knob 526 withdraws the pawl to such an extent that the halved pin 275 therein is out of engagement with its neighboring pins. See Fig. 36. In this position the trip lever engaged by this pawl and the trip levers to the right thereof, cannot be set in effective position by the actuation of a trip lever to the left thereof. If for instance it is desired to print the following entries:

```
 95   9575
156    987
``` the items set up in the item wheels will look thus:

```
95009575
156000987
``` and the printed total will appear thus:

```
251  10562
```

Eliminating device.

As hereinbefore mentioned, the four left hand gears 200 can be set in such a position that the four left hand total wheels are eliminated from the entering movement of the item wheels. This makes it possible to print numbers without adding or subtracting them. The sleeve 536 on which the four left hand gears 200 are mounted extends through the left side plate and has a helical cam slot cut into its outer end. On its inner end it has a small flange, and the right hand gear on the sleeve is cut out to receive this flange. See Fig. 17. A pin 537 in shaft 201 engages the cam slot. The shaft 201 is held against rotation and longitudinal movement by the link 365 and bell crank 363 connected to it on its right end. Another sleeve 538 with a short flange on its right hand end is mounted on sleeve 536 and held in position against the side plate by the shoulder screws 539 bearing against the flange. This sleeve may be rotated by a knurled knob 540 arranged to slide over it so that the slots in the hollow stem of the knob engage the pin 541 on the sleeve. A screw 542 in sleeve 538 engages a short lengthwise slot in sleeve 536 and constitutes the rotating means therefor. A stop collar 543, to limit the rotation of sleeve 536, has two notches adapted to engage a pin 544 on the inside of the side plate. One of the notches engages the pin when the machine is set for elimination while in adding position, as shown in Fig. 17, and the other engages the pin when the machine is set for elimination while in subtracting position. When the machine is in adding position with the eliminating device in normal position all the gears 200 are in a position relative to gears 202 and connecting sectors 166 like the right hand gear 200 as shown in Fig. 17. If the eliminating knob is now rotated in the direction opposite to that of the hands of a watch, the sleeve 538 will be rotated by pin 541 and the sleeve 536 rotated by screw 542. As the shaft 201 is held against both rotation and longitudinal movement, the pin 537 therein is held in fixed position and the helical cam slot engaging the pin will cause the sleeve 536 to have helical movement toward the left along the shaft. This movement will continue until the stop collar 543 engages the pin 544, and in this position the gears 200 are in the spaces between the connecting sectors, that is, in neutral position, and will not be engaged by the sectors. See Fig. 17. To guard the five right hand gears 200 against movement along the shaft, a pin 545 and the stop collar 366 are mounted on shaft 201, between which the gears are held. When the machine is set for subtraction the gears 200 are shifted to the left until the stop collar 366 on the right end of the shaft 201 outside of the side plate, strikes the side plate, and in this position the gears 200 are to the left of gears 202 and engage the connecting sectors and pinions, as shown in dotted lines in Fig. 26. When in this position, it requires but a short movement to set them in eliminating position and therefore the knob 540 is turned to a lesser extent. The knob therefore has three positions, a normal position, an eliminating position when the machine is set for addition, and an eliminating position when the machine is set for subtraction. See Fig. 3. To hold the knob against accidental movement when in either of the three positions, a detent 546 is mounted on the left side plate and arranged to engage any one of three notches cut into the flange of the sleeve 538. A spring 547 is connected to this detent and tends to hold it in engagement with the notched flange. The other end of this spring is connected to a lever 548 pivotally mounted on the side plate, the forward arm of which engages a cam notch in sleeve 538, and the rear arm of which will be moved up in front of an arm on lever 430 when the sleeve 538 is rotated, thereby locking the lever 430 against movement. This lever 430 is operated by the total key to set the ribbon in total printing position as stated before, and the purpose of locking it is to prevent the total key from being depressed while the machine is set in eliminating position. It will be readily understood that if the total key has been set and the lever 430 moved the same arm thereon will lock the lever 548 against movement, thereby locking the eliminating device against operation. This precaution is necessary, because the sum total in the machine may comprise all of the total wheels, and to print this sum total it is necessary to establish a connection between all the total wheels, the connecting sectors 166 and the type sectors, and this requires that the eliminating device be set in normal position.

In order to avoid the printing of zeros where not desired when one column is being eliminated, and to obtain a blank space between the column of eliminated figures and the right hand column, the machine should be set in split position whenever it is set for elimination. For instance, it is desired to print the following entries; wherein the left column denotes dates:

9  9250
13 90975
22 13565
31  7525

The machine is set for elimination and split and the items are set up in the item wheels as follows:

9009250
13090975
22013565
31007525

Before printing the total the elimination device is set to normal position. The printed list will appear as follows, the total being printed in red:

9  9250
13 90975
22 13565
31  7525
121315

*Locking devices.*

Locking devices are provided to lock the figure keys, the adding and subtracting keys, the back spacing key, and the total and subtotal keys, during the entire cycle of operations of the operating lever, in order to avoid accidental operation of said keys during the operation of the operating lever and thereby causing interference of parts and an interlocking of the mechanisms. A shaft 551 is journaled in the key-board side plates and a plate 552, inserted lengthwise therein, is normally in position to pass into the notches in the lower sides of the body portions of the figure keys 51 when the keys are depressed. See Figs. 7 and 9. A lever 553 is mounted on the left end of shaft 551 and a spring 554 normally tends to turn the shaft slightly to position the plate beneath the shoulder of the figure key notches and thereby to lock the keys. See Figs. 3 and 14. A lever 555 on shaft 152 abuts lever 553 and normally holds it in position with the plate opposite the figure key notches, so that the figure keys may be depressed. When the operating lever is actuated, the shaft 152 is oscillated by means hereinbefore described and the lever 555 moves forward, leaving the lever 553 free to be turned by its spring. The shaft 551 is turned thereby, moving the plate 552 into locking position and locking the keys so that they cannot be depressed. A lever 556 is mounted on shaft 551 adjacent to lever 553 and is arranged to be moved by the oscillation of the shaft into the path of a pin 557 on the subtotal key 441, thereby locking the subtotal key against depression. To lock the subtotal key in depressed position during the actuation of the operating lever, a short slot is provided on the lever 556 near its hub. In the depressed position of the subtotal key the pin 557 thereon is adapted to engage this slot when the operating lever is actuated, thereby locking the key in depressed position until the completion of the return stroke of the actuating lever.

On the right end of shaft 551 a lever 558 is mounted. See Figs. 2 and 25. The upper arm of this lever has an inverted L-slot which is engaged by the pin 559 on the total key 402. The lower arm of lever 558 has a locking projection 560 which is adapted to swing into the path of the lever 561 fixed to the spring lock pawl 356. When the shaft 551 is oscillated, the locking portion of the slot in lever 558 locks the total key in normal position, and the locking projection 560 locks the spring lock pawl 356 and through it the adding and subtracting key.

The back spacing key 485 has a locking projection 562 in position to engage the bar 552 when the bar is in locking position and lock the back spacing key so that it cannot be depressed. See Figs. 7 and 35.

Locking means are provided to lock the total key against operation when the item wheel carriage is "set," or moved from normal position and locking means are provided to lock the carriage in normal position when the total key is actuated. The link 404, connected to the total key by means of the bell crank 403, has an upward extending projection 563. See Figs. 17 and 25. A detent 564 is pivoted on the stud 565 mounted on the side plate above the link 404, and a spring 566 tends to throw this detent in front of the upward projection 563 on link 404. This detent is located slightly forward of the projection and when thrown in front of it by the spring prevents forward movement of the link. The right end of the carriage escapement bar 78 normally abuts the detent and holds it out of the path of the projection 563 against the tension of the pawl spring 566, as shown in Fig. 17. When the carriage has been escaped from normal position, the spring 566 will move the detent in front of the projection on the link and thereby lock it and the total key against operation.

An offset plate 567 is mounted on the projection 563 on link 404, and is positioned in such a way that when the carriage is in normal position and the total key is operated, thereby moving the link forward, the upper edge of the plate 567 enters the first space on the lower edge of the carriage escapement bar 78 and locks the carriage in normal position.

A lock bolt of any suitable construction is provided to lock the printing mechanism in printing or non-printing position, thereby to compel the printing of each and every item when the machine is locked in printing position. This lock is intended to prevent manipulation of the machine to obtain a total not corresponding with the sum total of a list of printed items. For instance, when subtracting and printing a list of items, if an item not on the list be subtracted without printing the same and then the subtraction and printing of the listed items be continued, the printed items will check up with the list, but the balance or remainder will be smaller to the extent of the unlisted items subtracted but not printed. The link 262, which cocks the hammers and actuates the ribbon feed and platen feed, extends upward through a slot in the casing. See Figs. 16 and 21. On the lower side of the casing a bolt lock 570 of any suitable design is so mounted that the bolt 571 of the lock may be shot across the central portion of the slot and lock the link 262 in whatsoever position it happens to be. The slot is of such length that the link is free to move up and down on either side of the bolt, which thus prevents the setting of the link from one position to the other until locked.

It is evident that many modifications in the detail construction and arrangement of parts of my calculating machine may be made without departing from the invention, and I do not wish to be limited to the mechanical construction shown and described.

What I claim is:

1. A calculating machine comprising a movable carriage, item members in said carriage, a series of stops on each of said item members, figure keys representing digits and means movable with said carriage operatively connected with the figure keys to be set thereby and coöperating with said stops to determine the setting of said item members to represent an item.

2. A calculating machine comprising a movable carriage, item members in said carriage, a stepped member on each of said item members, means movable with said carriage and arranged to coöperate simultaneously with said stepped members to determine the setting of said item members successively in position to represent an item.

3. A calculating machine comprising a movable carriage, a series of spring actuated item members in said carriage, a plurality of stops on each of the item members, and stop members carried by said carriage and arranged to be set by the figure keys to coöperate with the stops on the item members to release the item members and stop them in set position.

4. A calculating machine comprising a movable carriage, item members in said carriage, a series of stops on each of said item members, a pawl for each of said item members arranged to coöperate with said stops, figure keys representing the digits and means operatively connected to the keys to actuate said pawls in proportion to the figures of the keys operated.

5. A calculating machine comprising a carriage, a series of item members in said carriage, a series of pawls arranged to coöperate with said item members, figure keys representing the digits, means operatively connected to the keys to actuate the pawls in succession and means to hold the pawl in actuated position during a fractional part of the travel of the carriage.

6. A calculating machine comprising a carriage, item members in said carriage, a spring connected to each of said item members and tending to move same from normal position, a series of stops on each of the item members, a pawl for each of said item members and arranged to coöperate with said stops, figure keys representing the digits and means operatively connected to the keys to actuate the pawls in proportion to the figures of the keys operated.

7. A calculating machine comprising a carriage, item members therein, stop pawls for the item members, figure keys to actuate the carriage and to set the stop pawls for engagement with the item members and means to hold the stop pawls in set position during the movement of the item members while permitting movement of the figure keys.

8. A calculating machine comprising a carriage, item members in said carriage, a series of stops on each of said item members, a stop pawl for each of the item members, said stop pawl being arranged to be set in selective position to coöperate with the respective stops on the item members, figure keys to actuate the carriage and to set the stop pawls, the setting of the stop pawls thereby releasing and again stopping the item members after they have moved in proportion to the figures of the keys operated, and means to hold the stop pawls in set position during said movement of the item members therefor while permitting movement of the figure keys.

9. A calculating machine comprising a carriage, a series of item members in said carriage, springs on the item members tending to move the same from normal position, pawls arranged in said carriage for the item members to hold same against movement, a plurality of stops on the item members, figure keys representing the digits and means operatively connected to the keys coöperating with said pawls to release the item members and to set said pawls to stop the item members therefor after they have moved in proportion to the figure of the key operated.

10. A calculating machine comprising figure keys representing the digits and an oscillatable frame arranged to be actuated by the operation of any one of the figure keys to thereby lift from depressed position any key in depressed position.

11. In a calculating machine, a movable frame carrying item members, means for setting said item members successively to represent an item, said means being operated by keys representing the digits, and means whereby a second key may be operated to set an item member before the completion of the stroke of the key just operated.

12. A calculating machine comprising ten figure keys denoting the ten digits and arranged to be depressed one at a time, an oscillatable frame having two arms arranged adjacent to said keys, means connected to each of said ten keys and arranged to engage and move one of the arms of said frame from normal position and back to normal position during depressing movement of a key, the other arm of said frame being arranged across said keys in such a position that the depressing movement of another one of said keys will oscillate said frame and said last named arm and thereby raise said first mentioned key from depressed position.

13. A calculating machine comprising a movable carriage containing both a series of item members adapted to be set to represent an item and a series of stop members for the item members also adapted to be set to represent an item, and manually operable means to lock said stop members in set position.

14. A calculating machine comprising a movable carriage containing both a series of item members adapted to be set to represent an item and a series of stop members for the item members also adapted to be set to represent an item, and a key to lock said stop members in set position.

15. A calculating machine comprising a movable carriage containing both a series of item members adapted to be set to represent an item and stop pawls for the item members to limit the movement of the item members and also adapted to be set to represent an item, and a key to lock said stop pawls in set position.

16. A calculating machine comprising a carriage containing item members and means to move said item members to set position, an item retaining device comprising stop pawls adapted to be set to limit the movement of the item members, lock pawls for the stop pawls, and a key to move the lock pawls to engage and lock the stop pawls in set position thereby to permit said item member moving means to return the item members to set position.

17. A calculating machine comprising a movable carriage containing a series of item members adapted to be set to represent an item, stop pawls for the item members to limit the movement of the item members and adapted to be set to represent an item, figure keys, means connected with the figure keys to set the stop pawls, and means to lock the stop pawls in set position.

18. A calculating machine comprising a movable carriage, item members adapted to be set to represent an item mounted in said carriage, a series of stops on each of said item members, a stop pawl for each of said item members adapted to be set in position to coöperate with the series of stops on the item members, and means simultaneously to lock all of the stop pawls.

19. A calculating machine comprising a movable carriage containing item members adapted to be set to represent an item, an item retaining device comprising stop pawls adapted to be set to limit the movement of the item members, lock pawls for the stop pawls, and means to move the lock pawls to engage and lock the stop pawls in set position thereby to retain the set up item in the item members.

20. A calculating machine comprising a movable carriage containing both a series of item members adapted to be set to represent an item and a series of stop members for the item members also adapted to be set to represent an item, figure keys, means connected to the figure keys to move the carriage step by step, an operating lever, means connecting with the operating lever to retract the carriage to normal position, and means to set the carriage retracting means in ineffective position.

21. A calculating machine comprising a movable carriage, item members in said carriage adapted to be set to represent an item, a series of stop members in said carriage adapted to coöperate with the item members and to be set to represent an item, figure keys, means operatively connecting the figure keys to move the carriage step by step, an operating lever, means connected to the operating lever to retract the carriage to normal position, and a key adapted to be set simultaneously to lock the aforesaid stop members in set position and to set the carriage retracting means in ineffective position.

22. In a calculating machine, a movable carriage and step by step escapement therefor, retracting means for the carriage comprising a lever connected for actuation by the actuating lever, a pawl on said lever, a sector operatively connected to said carriage for moving the same, said sector being adapted to be engaged by said pawl for actuation by said retracting lever, and means for holding said pawl out of engagement with said sector to prevent the actuation thereof to return said carriage to normal position.

23. A calculating machine comprising a laterally movable carriage, a register adapted to show a multiplier or quotient by registering the number of times an item has been added or subtracted respectively, said register comprising a series of numeral disks, an oscillatable frame, a pawl mounted on said frame and adapted to engage and move said numeral disks tooth by tooth, means on said carriage to move said pawl to bring it in coöperative position with the numeral disks in succession, and an operating lever, and means connected thereto to oscillate said frame.

24. A calculating machine comprising a totalizing mechanism, a laterally movable carriage, item members in the carriage, figure keys, means operatively connected to the keys to move the carriage laterally to position the item wheels in the desired order of the totalizing mechanism, a series of register disks independent of the totalizing mechanism and corresponding respectively to the various lateral positions of the carriage, an operating lever, actuating means for the register disks connected with the operating lever, and means connected to the carriage to position the actuating means for the register disks.

25. A calculating machine comprising item mechanism and totalizing mechanism, said mechanism being relatively laterally movable and adapted to be coöperatively actuated in their various lateral positions, figure keys to induce said relative movement, an operating lever to actuate said mechanisms, a series of register disks independent of the totalizing mechanism and corresponding respectively with the various relative lateral positions assumed by said mechanisms, said register disks being adapted to be actuated to indicate the number of actuations of said mechanisms in each of the various relative lateral positions thereof, means operatively connected with the figure keys to position the actuating means of the register disks and means connected with the operating lever to actuate the respective register disks.

26. A calculating machine comprising a register adapted to be set to show a multiplier or quotient and comprising a series of numeral wheels, a pawl adapted to engage and set the numeral wheels, figure keys, means operatively connected to the figure keys to position the pawl, an operating lever and means operatively connected thereto to actuate the pawl, and manually operable means to engage and rotate the numeral wheels to zero position.

27. A calculating machine comprising a carriage adapted to be moved step by step from normal position, item members in said carriage adapted to be moved in proportion to the figures of an item, an item retaining device adapted to be set to retain the item members in set up position, an operating lever, means to retract the carriage operatively connected to the operating lever, a register adapted to be set to show the multiplier or quotient, means to actuate the register operatively connected to the operating lever, and a key adapted to be set to simultaneously set the item retaining device and the register actuating means in effective position and the carriage retracting means in ineffective position, whereby successive addition or subtraction may be performed in any desired decimal order and a visual record thereof obtained.

28. A calculating machine comprising a key adapted to be set to simultaneously set the item retaining device and the register actuating means in effective position and the carriage retracting means in ineffective position, a lock pawl to lock said key in set position, item mechanism and totalizing mechanism normally out of operative connection, means to operatively connect said mechanism and a key adapted to be set to thereby release and reset the first mentioned key and the devices set by same and to set the connecting means of the item mechanism and totalizing mechanism in ineffective position.

29. A calculating machine comprising an operating lever, item wheels, and clearing pinions, drive mechanisms for said item-wheels, and clearing pinions, a shaft arranged to be oscillated by said operating lever, a double helical spring enveloping said shaft, said spring being wound from its center to the left and to the right in opposite directions, the center portion of the spring being fastened to said shaft and the two ends being connected to said drive mechanism.

30. A calculating machine comprising item members arranged to be set to represent an item, a bar arranged to engage and restore the item members to zero position, an operating lever, and means to transmit movement from said operating lever to said bar, said means being arranged to change the velocity ratio between the operating lever and bar during the operation of the lever.

31. A calculating machine comprising item members arranged to be set to represent an item, an operating lever, a bar operatively connected to the operating lever, and arranged to engage and restore the item members to normal position, and a velocity ratio changing device interposed between the operating lever and said bar to move and restore the item members with gradually diminishing velocity.

32. A calculating machine comprising item members arranged to be set to represent an item, an operating lever, a restoring device for the item members operatively connected to the operating lever and arranged to receive uniform movement from the operating lever and to transform it and deliver to the item members movement of gradually diminishing velocity.

33. In a calculating machine comprising a series of item members pivoted on the same axis and means for moving said item members through angles proportional to the respective figures of an item, means for returning said item members to zero position comprising a bar mounted to swing about the pivotal axis of the item members and adapted to engage said item members for return movement, a link motion for actuating said bar, said link motion comprising a lever arm arranged to be actuated by the actuating lever, and a link connecting said lever arm with said bar, the axis of rotation of said lever arm being in line with the pivotal connections of said links near the end of the return movement of said item members.

34. A calculating machine comprising toothed item members, totalizing mechanism, a series of intermediate gears movably mounted, an operating lever, and means actuated by said lever to move the intermediate gears to operatively connect the item members and totalizing mechanism.

35. A calculating machine comprising toothed item members, printing mechanism, a series of connecting gears movably mounted, an operating lever, and means operatively connected to said lever to move the connecting gears to operatively connect the item members with the printing mechanism.

36. A calculating machine comprising item members, totalizing mechanism, and printing mechanism, said mechanisms being normally out of operative connection, a series of movably mounted connecting members, and means to move the connecting members to operatively connect both the item members and totalizing mechanism with the printing mechanism.

37. A calculating machine comprising item members, total wheels and printing members, a series of movably mounted connecting members normally operatively connected to the printing members, and means to move the connecting members into operative connection with both the item members and total wheels.

38. In a calculating machine item members and printing members, a movable shaft, a series of gear sectors on said shaft, said gear sectors being normally operatively connected to said printing members, and means to move said shaft to move the gear sectors into operative engagement with the item members.

39. In a calculating machine, item mechanism, an oscillatable frame, a series of sectors in said frame, a series of type carrying members operatively connected to said sectors, an operating lever, means connected to the operating lever to oscillate said frame to thereby connect the type carrying members to the item mechanism through said sectors.

40. A calculating machine comprising item mechanism and totalizing mechanism, said mechanisms being normally out of operative connection, a series of independent connecting members movably mounted, an operating lever and means connected to the operating lever to move the connecting members into operative connection with the item mechanism and the totalizing mechanism at the initial portion of the initial stroke and to move them out of operative connection at the initial portion of the return stroke of the lever.

41. A calculating machine comprising item mechanism, totalizing mechanism and printing mechanism, said mechanisms being normally out of operative connection with each other, an operating lever, means connected to the operating lever to operatively connect the item mechanism, the totalizing mechanism and the printing mechanism at the initial portion of the initial stroke of the lever and disconnect the same at the initial portion of the return stroke of the lever.

42. A calculating machine comprising item members arranged to be set to represent an item, totalizing mechanism, printing mechanism comprising printing members, said mechanisms being normally out of operative connection, an oscillatable frame, a series of gear sectors pivoted in said frame, links connecting the gear sectors to the printing members and means to oscillate the frame to operatively connect the gear sectors with the item members.

43. A calculating machine comprising item members arranged to be moved in proportion to the figures of an item, a series of sectors arranged to be moved into operative connection with the item members, a series of type carrying members, links connecting the type carrying members to said sectors, an operating lever, means actuated by the operating lever to move said sectors into operative connection with the item members, and means actuated by the operating lever to restore the item members to zero position and transfer this restoring movement to the type carrying members.

44. A calculating machine comprising a series of item members, totalizing mechanism, and printing mechanism comprising a series of printing members, an oscillatable frame, a series of gear sectors loosely mounted in said frame and operatively connected to the printing members, and means to oscillate the frame to move the gear sectors into operative connection with the item members and totalizing mechanism.

45. In a calculating machine, item mechanism, an oscillatable frame, a series of sectors pivotally mounted in said frame, a series of type carrying members, links connecting the respective type carrying members to the sectors, an operating lever, and means connected to the operating lever to oscillate said frame to thereby connect the respective type carrying members to the item mechanism through said sectors.

46. A calculating machine comprising item mechanism, totalizing mechanism, a frame arranged to be oscillated and carrying the means to operatively connect and disconnect said mechanisms, a sector 173, a cam plate 176 on said sector, a frame shaft, a lever on said frame shaft, a pawl 171 mounted on said lever, and arranged to coöperate with said sector, a pin 175, a pin 174 on pawl 171 to coöperate with the pin 175, and a pawl 177 to coöperate with the cam plate and pin 174, substantially as described.

47. A calculating machine having in combination with total wheels a series of gears operatively connected to the total wheels, a shaft for the gears, means to shift the shaft and gears, printing members, means to operatively connect the printing members and said gears, and means to transfer movement from the total wheels to the printing members and from the printing members to the total wheels.

48. A calculating machine comprising item members, totalizing mechanism, a series of connecting gears movably mounted, an operating lever, means operatively connected to said lever to move the connecting gears to operatively connect said item members and totalizing mechanism, and means to set the last mentioned means in ineffective position.

49. A calculating machine comprising item members, printing mechanism, a series of connecting gears movably mounted, an operating lever, means operatively connected to said lever to move the connecting gears to operatively connect the item members and printing mechanism, and means to set the last mentioned means in ineffective position.

50. A calculating machine comprising totalizing mechanism, printing mechanism, a series of movably mounted connecting gears between said totalizing and printing mechanisms, said gears being normally out of operative engagement, an operating lever, means operatively connected to said lever to move said connecting gears into operative engagement, and means to set the last mentioned means in ineffective position.

51. A calculating machine comprising item mechanism, and totalizing mechanism comprising total wheels, a series of shiftable gears interposed between said item mechanism and said total wheels and adapted to operatively connect the same in either of two positions, a second series of shiftable gears, and means to interpose said second series of gears between said item mechanism and total wheels, said second series of gears being adapted to coöperate with said first series in either position and operatively connect said item mechanism with said total wheels.

52. A calculating machine comprising total wheels, a series of gears operatively connected to the total wheels, a carriage, item members in said carriage, means to move said carriage to bring the item members into coöperative position with said gears, means to transmit movement from the item members to the total wheels through said gears, and means to set said gears in either of two positions to thereby cause rotation of the total wheels in either direction.

53. A calculating machine comprising item members, stationary total wheels, a single series of shiftable gears operatively connected to said total wheels in either of two positions, means to transmit movement from the item wheels to the total wheels through said gears and means to set said gears in either of said two positions to thereby cause rotation of the total wheels in either direction.

54. A calculating machine comprising item mechanism, a series of stationary total wheels arranged to rotate in one direction for addition and in the reverse direction for subtraction, a single series of shiftable gears to connect the total wheels with the item mechanism and arranged to be set in either of two positions to transmit movement to the total wheels either in adding direction or in subtracting direction, manually operable means to set said gears in either position and a locking device arranged to hold the gears in set position.

55. A calculating machine comprising total wheels adapted to be rotated in one direction for addition and in the reverse direction for subtraction, a series of type carrying members, a series of gears interposed between the type carrying members and the total wheels and adapted to be set in either of two positions to transmit either adding or subtracting movement to the total wheels, and an operating lever arranged to operatively connect the type carrying members and total wheels and set the type carrying members to represent an item and simultaneously transfer corresponding movement to the total wheels either in adding or subtracting direction.

56. A calculating machine comprising a series of shift gears adapted to be shifted to set the machine either in adding or subtracting position, a shaft adapted to be shifted longitudinally; said gears being rotatably mounted on said shaft and longitudinally shiftable therewith, a key operatively connected to said shaft and adapted to shift and set the shaft and gears in adding position, and a second key operatively connected to said shaft and adapted to shift the said shaft and gears in subtracting position, said keys being manually operable and each adapted to reset the other.

57. A calculating machine comprising item mechanism, a series of total wheels arranged to rotate in one direction for addition and in the reverse direction for subtraction, a series of gears to connect the total wheels with the item mechanism and adapted to be set in either of two positions to transmit movement to the total wheels either in adding direction or in subtracting direction, manually operable means to set said gears in either position and comprising a key to set them in one position, a second key to set them in the other position, stops to limit the setting movement and a spring to hold the gears against the stops in either position to thereby lock them in the respective position.

58. A calculating machine comprising total wheels, an oscillating frame, lock pawls for the total wheels mounted in said frame, a carriage, a locking device for said lock pawls controlled by said carriage, an operating lever, and means actuated by the operating lever to oscillate the frame and move said lock pawls from effective to ineffective position.

59. In a calculating machine, a carriage having a step by step movement, a series of total wheels having teeth, lock pawls mounted in a movable frame adapted to be shifted to carry said pawls into and out of engagement with the teeth on said total wheels, means controlled by said carriage for simultaneously locking and successively unlocking said pawls in engagement with said total wheels, and means for moving said frame to disengage said unlocked pawls simultaneously from said total wheels.

60. In a calculating machine, the combination with total wheels of lock pawls for the total wheels, a locking device for the lock pawls, a carriage arranged to have step by step movement, item members in the carriage, means connected with the carriage to set the locking device in operative position, said means being arranged to permit the unlocking of the lock pawls of such of said total wheels as are in coöperative position with the item members and to lock the lock pawls of such total wheels as are not in coöperative position with the item members.

61. In a calculating machine, the combination with total wheels of lock pawls for the total wheels, a locking device for the lock pawls, a carriage arranged to have step by step movement, item members in the carriage, means connected with the carriage to set the locking device in effective position, said means being arranged to permit the unlocking of the lock pawls of such of said total wheels as are in coöperative position with the item members and to lock the lock pawls of such total wheels as are not in coöperative position with the item members, retracting means for said carriage, the retraction of said carriage to normal position setting in ineffective position said means to set the locking device in effective position.

62. A calculating machine comprising a series of total wheels subject both to entering and to carrying movement, a series of lock pawls to lock the total wheel against accidental movement, a shaft arranged to be rotated by the operating lever, means on the shaft to impart carrying movement to the total wheels in succession, and means connected with this shaft to unlock the total wheels in succession for carrying movement and to relock them after carrying movement.

63. A calculating machine comprising a series of total wheels, a series of carrying pawls for the total wheels, means on the total wheels to set the carrying pawls, a series of lock levers to lock the carrying pawls in normal and in set position, means on the total wheels to coöperate with the lock levers to unlock and relock the carrying pawls, an operating lever, and means connected to the operating lever arranged to coöperate with the locking levers in succession to unlock the carrying pawls, to actuate them to carry and to relock them in normal position.

64. A calculating machine comprising a series of total wheels, a carrying train arranged between each two adjacent total wheels and comprising a carrying element arranged to engage and carry the total wheel of higher order, means on the total wheel of lower order to lock the carrying element in normal position, to release it, to set it in position to carry and to relock it in set position, an operating lever, means connected to the operating lever to unlock the carrying element, to impart movement to it in reversed direction to the setting movement to thereby engage and carry the total wheels of higher order, and to relock it in normal position.

65. A calculating machine comprising a series of total wheels, a carrying train arranged between each two total wheels, a carrying pawl arranged to engage and carry the total wheel of higher order, means on the total wheel of lower order to move the carrying pawl a distance of one tooth oppositely to the carrying direction to thereby set it in position to carry, means on the total wheel of lower order to lock the carrying pawl in normal position, to release it for setting movement and to relock it in set position, an operating lever, means connected to the operating lever to move the carrying pawl one tooth to thereby carry the total wheel of higher order and to restore the pawl to its normal position, and means connected to the operating lever to unlock the carrying pawl for such carrying movement and to relock it after carrying movement in normal position.

66. A calculating machine comprising a series of total wheels arranged to be rotated in one direction for addition and in the reverse direction for subtraction, a carrying train arranged between each two adjacent total wheels and comprising a carrying pawl arranged to engage to carry the total wheel of higher order in either direction, means on the total wheels of lower order arranged to be effective during rotation in either direction to move the carrying pawl a distance of one tooth opposite the carrying direction to set it either in position to carry for addition or in position to carry for subtraction.

67. A calculating machine comprising a series of total wheels arranged to be rotated in one direction for addition and in the reverse direction for subtraction, a carrying train arranged between two adjacent total wheels and comprising a carrying pawl arranged to engage and carry the total wheel of higher order, means on the total wheel of lower order arranged to be effective during rotation in either direction to move the carrying pawl the distance of one tooth in the opposite direction to the total wheel, to thereby set the carrying pawl in position to carry either for addition or for subtraction, an operating lever, means connected to the operating lever to restore carrying pawls out of normal position to normal position to thereby carry their respective total wheels.

68. A calculating machine comprising a series of total wheels arranged to be rotated in one direction for addition and in the reverse direction for subtraction, a carrying train arranged between each two adjacent total wheels and comprising a carrying pawl to carry the total wheel of higher order, a disk mounted on the total wheel and having a concentric surface with a recess for every tenth tooth of the total wheel, a lock pawl arranged to coöperate with said disk and with the carrying pawl to lock the carrying pawl in normal position by the concentric surface thereof and to release and relock it by the recesses therein, a disk mounted on the total wheel and having a projection for every tenth tooth of the total wheel and arranged to move and set the carrying pawl in position to carry, said movement occurring in the interval between the release and relocking of same by the lock lever, a lever connected to the aforesaid lock pawl, an operating lever and cam shaft arranged to be rotated thereby, a cam disk mounted on said cam shaft to coöperate with said lock pawl to release the carrying pawl for restoring movement and to relock it in normal position.

69. A calculating machine comprising total wheels, lock pawls for the total wheels, carrying pawls for the total wheels, lock disks on the total wheels, lock disks connected to the operating lever to lock the carrying pawls, lock disks connected to the operating lever to lock the total wheels, lock pawls and levers arranged to coöperate with the lock disks on the total wheels and the lock disks connected to the operating lever respectively to lock the carrying pawl in normal and in set position.

70. In a calculating machine a carrying mechanism comprising total wheels, lock pawls 213 for the total wheels, set disks 301 on the total wheels, lock disks 302 on the total wheels, set levers 303, set pawls 307 on the set levers, a guide shaft for the set pawls, carrying pawls 311 on the set levers, lock levers 309 and 310 for the set levers, set pawls 313 for the carrying pawls, actuating cams 305 for the set levers and the set pawls 313, lock disks 312 for the lock levers 310 and 309, lock disks 328 for the lock pawls 213, substantially as described.

71. A calculating machine comprising total wheels, an oscillating frame, lock pawls for the total wheels pivotally mounted in said frame, an operating lever, means connected to the operating lever to oscillate the frame to disengage the lock pawls from the total wheels.

72. In a calculating machine a carrying mechanism arranged between each two adjacent total wheels and comprising a set lever, a carrying pawl operatively connected to the set lever, a set pawl operatively connected to the set lever, means on the total wheel to move and set said set lever by engaging and moving said set pawl and a shaft rotatingly mounted and arranged to coöperate with said set pawl to constrain the movement of same.

73. In a calculating machine totalizing mechanism comprising a series of carrying trains, each train comprising a total wheel, a set disk connected to the total wheel, set projections on the set disk, an actuating lever, a carrying pawl operatively connected to said actuating lever and adapted to engage and carry the total wheel of next higher order, means operatively connecting said actuating lever and said set disk to set the actuating lever in either of two positions by the rotation of the total wheel, and means operatively connected to the operating lever to reset said actuating lever.

74. In a calculating machine totalizing mechanism comprising a series of carrying trains, each train comprising the total wheel, a lock disk on the total wheel having a release notch for every tenth tooth of the total wheel, a carrying pawl adapted to engage and carry the total wheel of next higher order, means on the total wheel to set said carrying pawl in either of two positions, and a lock lever operatively connecting said lock disk and said carrying pawl to lock said carrying pawl in normal position and in set position, and means connected to the operating lever to release the carrying pawl when in set position, to move it to carry and to relock it in normal position.

75. In a calculating machine, a series of total wheels and gear trains therefor, a series of clearing pinions fixed on a shaft, said pinions being normally out of mesh with said gear trains respectively, means whereby said gear trains are put in position to mesh with said clearing pinions by the rotation of the total wheels from zero position, and means for rotating said clearing pinions causing the latter to mesh with such of the gear trains as are moved from zero position and to move them to zero position and unmesh therewith, said clearing pinion rotating means comprising mechanism for transforming uniform motion into motion of gradually diminishing velocity.

76. In a calculating machine comprising total wheels and clearing pinions for moving said total wheels to zero position, means for rotating said pinions comprising a shaft carrying a driving disk, a pawl on said disk, a pinion loosely mounted on said shaft and carrying a ratchet adapted to be engaged by said pawl, a fixed stop adapted to be engaged by said pawl, means for rotating said pinion, and means for setting said pawl in engagement with said fixed stop or said ratchet.

77. A calculating machine comprising a series of total wheels, means to reset the total wheels to zero position, and a zero stop for each total wheel adapted to be set to stop the total wheel in zero position and comprising a shaft, a series of projections on the shaft, and means to oscillate the shaft to set the projections in position to stop the total wheels in zero position.

78. In a calculating machine, total wheels and means for returning them to zero position, cam disks carried by said total wheels, said cam disks each having a projection corresponding to the zero position on its total wheel, zero stops for said total wheels, said zero stops being arranged on a shaft adapted to be oscillated to bring said stops into position to engage said cam disk projections when returned to the zero position, and means for oscillating said shaft to set said stops in engaging position prior to the returning movement of the total wheels and to set said stops out of engaging position at the end of the returning movement of the total wheels.

79. In a calculating machine, a total key, total wheels and means for returning them to zero position, said means being adapted to be set in operative position by said total key, cam disks carried by said total wheels, said cam disks each having a projection corresponding to the zero position on its total wheels, zero stops for said total wheels, said zero stops being arranged on a shaft adapted to be oscillated to bring said stops into position to engage said cam disk projections when returned to the zero position, and means operatively connected to said total key for oscillating said shaft to set said stops in engaging position simultaneously with the setting of the total wheel returning means in operative position by said total key.

80. In a calculating machine the combination with a totalizing mechanism arranged to be set for addition or subtraction, of a clearing device for same, an operating lever, and a key to cause the clearing device to be operated by the operating lever and simultaneously to set the totalizing mechanism for subtraction.

81. In a calculating machine the combination with a totalizing mechanism arranged to be set for addition and subtraction, of a clearing device for same, an operating lever, key controlled means to connect the clearing device to the operating lever and to set the totalizing mechanism for subtraction, and means connected to the operating lever to disconnect the clearing device and to reset the totalizing mechanism to adding position.

82. In a calculating machine, totalizing mechanism, a series of gear trains coöperating with said totalizing mechanism, said gear trains comprising a series of shiftable gears, clearing pinions for said totalizing mechanism and actuating mechanism therefor, and key actuated means for moving said shiftable gears to introduce a series of reversing gears into said gear trains, said key actuated means also operating to set the clearing pinion actuating mechanism into operative position.

83. In a calculating machine having an adding key, a subtracting key and a total key, a lever pivotally mounted at its middle point, said adding and subtracting keys being respectively pivoted to the opposite ends of said lever, a pawl on said total key adapted to engage a notch on said subtracting key when the latter is in raised position, whereby depressing said total key also depresses said subtracting key and raises said adding key.

84. In a calculating machine the combination with total wheels, of a clearing device for the total wheels, type carrying members, an operating lever, means connected to the operating lever to actuate the clearing device during the initial stroke of the lever, means connected to the operating lever to connect the type carrying members with the total wheels during the initial stroke of the lever and to connect them during the return stroke of the lever, and a plate actuated by the operating lever on the return stroke of same to engage and return the type carrying members to zero position and reset the total wheels to their former position.

85. A calculating machine comprising totalizing mechanism, printing mechanism and a series of connecting gears movably mounted, an operating lever, means operatively connected to same to move the connecting gears to operatively connect the totalizing mechanism and printing mechanism at the initial portion of the initial stroke of the operating lever and to disconnect the said mechanisms at the initial portion of the return stroke, and a key adapted to be set prior to the actuation of the operating lever to move the connecting gears to operatively connect the totalizing mechanism and printing mechanism and to hold said mechanisms in operative connection during the return stroke of the operating lever.

86. A calculating machine comprising total wheels adapted to be rotated in one direction for addition and in the reverse direction for subtraction, a series of type carrying members, a series of gears interposed between the type carrying members and the total wheels and adapted to be set in either of two positions to transmit either adding or subtracting movement to the total wheels, an operating lever arranged to operatively connect the type carrying members and the total wheels during the initial stroke of the lever and to simultaneously enter an item into the type carrying members and into the total wheels and to disconnect the type carrying members from the total wheels during the return stroke of the lever and to reset the type carrying members to normal position, and manually operable means to modify the function of the aforesaid means so that the type carrying members and the total wheels remain in operative connection during the return stroke of the operating lever and the resetting movement of the type carrying members is retransferred into the total wheels.

87. In a calculating machine, the combination with total wheels of a clearing device for the total wheels, type carrying members, an operating lever, means connected to the operating lever to actuate the clearing device during the initial stroke of the lever, means connected to the operating lever to connect the type carrying members with the total wheels during the initial stroke of the lever and to disconnect them during the return stroke thereof, means to modify the function of the last mentioned means so that the type carrying members remain operatively connected with the total wheels during the return stroke of the lever, and a plate actuated by the operating lever on the return stroke thereof to engage and return the type carrying members to zero position.

88. A calculating machine comprising a series of type carrying sectors having a concentric portion with V-shaped notches, a shaft having a series of alining pawls adapted to aline and lock the sectors by engaging the notches in the concentric portion thereof, an operating lever and means connected to the operating lever to actuate the said shaft.

89. A calculating machine comprising a series of type sectors, a hammer for each type sector, a trip lever for each hammer, a cam on each type sector, adapted to coöperate with the trip lever of the respective hammer to set the trip lever in effective position when the type sector is actuated.

90. A calculating machine comprising a series of type sectors, a shaft, a series of hammers loosely mounted on said shaft, a swinging frame fixed on said shaft, a series of set pawls mounted in said frame and adapted to engage said hammers, an operating lever, and means connected to the operating lever to oscillate said shaft and swing said frame to thereby set the hammers.

91. A calculating machine comprising a series of type sectors, a shaft, a series of hammers loosely mounted on said shaft, a swinging frame fixed on said shaft, a series of set pawls mounted in said frame and adapted to engage said hammers, an operating lever, means connected to the operating lever to oscillate said shaft and swing said frame to thereby set the hammers, and means connected to the type sectors to release the set pawls.

92. A calculating machine comprising a series of type sectors, a series of hammers, springs for the hammers tending to hold them in normal position and a setting device for the hammers comprising a shaft for the hammers, a swinging frame fastened to said shaft, a series of set pawls mounted in said frame, adapted to engage and set the hammers, an operating lever, means connected to the operating lever to oscillate said shaft and swinging frame to thereby set said hammers, and means operatively connected to the type sectors to release the set pawls from the hammers to thereby cause the same to move to normal position and print.

93. A calculating machine comprising a series of type sectors, a hammer for each type sector, a trip lever for each hammer, a cam on each type sector, adapted to coöperate with the trip lever of the respective hammer to set the trip lever in effective position when the type sector is actuated, and a transferring device for the trip levers to transfer the movement imparted to a trip lever by its respective type sector cam to all the trip levers to the right thereof.

94. In a calculating machine comprising a series of movable type holders for printing type, a series of impression hammers, a series of trip levers for the hammers, the several trip levers each being adapted to be set to a trip hammer by movement of the corresponding type holder, transferring pawls for setting the trip lever to the right of any trip lever set by a type holder, said pawls being pivotally mounted all on the same axis, and each having parts adapted to engage the adjacent pawls, and means for moving one of said pawls out of line with the others whereby it no longer is adapted to engage with the pawls adjacent thereto.

95. In a calculating machine the combination with a series of item members arranged to be positioned to represent an item, of a series of type carrying members, a corresponding number of total wheels, means to transmit entering movement from the item members simultaneously to the type carrying members and total wheels to print and add an item, and means to eliminate certain of said total wheels from such entering movement to thereby print such figures without adding the same.

96. In a calculating machine, the combination with a series of item members, of a series of type carrying members, a series of total wheels, a series of gears operatively connected with the total wheels, means to transmit movement from the item members both to said series of gears and to the type carrying members, and means to move certain of said gears to inoperative position where they and the total wheels will not be subject to movement from the item members, thereby to print a number without adding same.

97. In a calculating machine, the combination with a series of item members, of a series of type carrying members, a series of total wheels, a series of gears operatively connected with the total wheels, means adapted to transmit movement from said series of gears to said type carrying members, said means also being adapted to transmit movement from said item members to said gears and type carrying members, means to move certain of said gears to inoperative position where they and the total wheels will not be subject to movement from the item members, thereby to print a number without adding same, and means to rotate said series of gears independently of the item members to transfer and print the total of the items added.

98. In a calculating machine, the combination with a series of item members of a series of type carrying members, a series of total wheels, a series of gears operatively connected with the total wheels, means to transmit movement from the item members both to said series of gears and to the type carrying members, means to move certain of said gears to inoperative position where they and the total wheels will not be subject to movement from the item members, to thereby print a number without adding same, means to transmit movement from said series of gears to the type carrying members, and means for preventing actuation of said series of gears to transmit movement to said type sectors when any of said gears are in inoperative position.

99. A calculating machine comprising an item mechanism, total wheels adapted to be rotated in one direction for addition and in the reverse direction for subtraction, a series of gears interposed between the item mechanism and the total wheels, said gears being adapted to be set in either of two positions to transmit movement in either direction to the total wheels, means to transmit movement from the item wheels to the total wheels and means to set certain of said gears in neutral position in which they will not transmit any movement to the total wheels.

100. A calculating machine comprising a series of gears adapted to be shifted in unison to be set in position to transmit either adding or subtracting movement to the total wheels, a shaft longitudinally movable, certain of said gears being rotatably mounted on said shaft and longitudinally movable therewith, a sleeve longitudinally movably mounted on said shaft, certain of said gears being rotatably mounted on the sleeve and longitudinally movable therewith, means to move the shaft with the sleeve longitudinally to set all of the gears in either of the two positions and means to move said sleeve longitudinally on the shaft to set the gears mounted thereon in neutral position in which they will not transfer any movement to the total wheels, thereby eliminating certain of the total wheels from entering movement.

101. A calculating machine comprising printing mechanism adapted to be set in effective position to print, and locking means for preventing said printing mechanism from being set in ineffective position to print, said locking means being operable by a removable pass key.

102. A calculating machine comprising a totalizing mechanism having numeral disks to indicate visually the number to be multiplied or divided, register disks to indicate the multiplier or quotient, and decimal point lugs movably mounted to point off the fractional part of the numbers.

103. A calculating machine comprising a totalizing mechanism having numeral disks to indicate visually a dividend, register disks to indicate visually a quotient, a rod mounted adjacent to said disks, and members slidable on said rod to indicate visually the position of the decimal points in said dividend and quotient respectively.

104. A calculating machine comprising item mechanism having a series of numeral disks to display the "set up" item, totalizing mechanism having a series of numeral disks to display the sum total, said mechanisms being relatively movable to position a set up item in the desired order of the totalizing mechanism, a casing having openings to display said numeral disks and lines drawn on said casing to denote the position of the item mechanism relative to the totalizing mechanism.

105. A calculating machine comprising a carriage, a series of visual item members in said carriage, a series of stop members in said carriage adapted to be set to stop the movement of said item members, figure keys, and means connected to said figure keys to set said stop members.

106. In a calculating machine comprising total wheels, means for returning said total wheels to zero position, said means being actuated from the operating lever by connections adapted to transform uniform movement into movement of gradually decreasing velocity.

107. In a calculating machine, type carrying devices, means for setting said devices to represent an item, said means being actuated from the operating lever by connections adapted to transform uniform movement into movement of gradually decreasing velocity.

108. In a calculating machine comprising a carriage adapted to have lateral movement, a series of total wheels, lock pawls for the total wheels, and a locking device for the lock pawls operatively connected with said carriage, said locking device being adapted to be positioned by the lateral movement of said carriage to permit releasing movement of the lock pawls.

109. A calculating machine comprising total wheels, item mechanism comprising a movable carriage, figure keys adapted to move the carriage step by step to bring the item mechanism into coöperative position with the total wheels, lock pawls for the total wheels, and a locking device for the lock pawls operatively connected with said carriage, to be positioned by the movement of the carriage to permit the unlocking of the lock pawls for such total wheels as are brought into coöperative position with the item mechanism.

Signed at St. Louis, Missouri, this 17th day of October, 1912.

RICHARD von REPPERT.

Witnesses:
AMASA M. HOLCOMBE,
PAULINE AMBERG.